(12) United States Patent
Shimazu et al.

(10) Patent No.: US 7,228,505 B2
(45) Date of Patent: Jun. 5, 2007

(54) DISPLAY DEVICE FOR WORKING MACHINE

(75) Inventors: Mitsuhiro Shimazu, Hiratsuka (JP); Kenji Kooriyama, Kirakata (JP)

(73) Assignee: Komatsu Ltd., Tokyo (JP)

( * ) Notice: Subject to any disclaimer, the term of this patent is extended or adjusted under 35 U.S.C. 154(b) by 373 days.

(21) Appl. No.: 09/920,736

(22) Filed: Aug. 3, 2001

(65) Prior Publication Data
US 2002/0015062 A1 Feb. 7, 2002

(30) Foreign Application Priority Data
Aug. 7, 2000 (JP) .............................. 2000-238608
May 8, 2001 (JP) .............................. 2001-137701

(51) Int. Cl.
*G06F 3/00* (2006.01)
*G05D 1/00* (2006.01)

(52) U.S. Cl. ..................... 715/771; 715/772; 701/9; 701/29; 701/99

(58) Field of Classification Search ............... 715/771, 715/772, 802, 810, 825; 701/29, 30, 99, 701/9, 14–16, 23, 24
See application file for complete search history.

(56) References Cited

U.S. PATENT DOCUMENTS

| | | | |
|---|---|---|---|
| 5,648,755 A * | 7/1997 | Yagihashi | 340/439 |
| 5,847,704 A * | 12/1998 | Hartman | 345/764 |
| 6,426,761 B1 * | 7/2002 | Kanevsky et al. | 345/788 |
| 6,466,235 B1 * | 10/2002 | Smith et al. | 345/771 |
| 6,721,634 B1 * | 4/2004 | Hauler et al. | 701/1 |

FOREIGN PATENT DOCUMENTS

JP 9-78636 3/1997

* cited by examiner

*Primary Examiner*—Ba Huynh
(74) *Attorney, Agent, or Firm*—Posz Law Group, PLC; R. Eugene Varndell, Jr.

(57) ABSTRACT

The invention is directed to a display device for working vehicle, which is adapted so that additional information can be displayed. In the invention, display indication marks of the two types can be interchangeably displayed on a common display screen of a limited area without reducing the sizes of the individual marks, so that neither a larger size of a display device nor a drop in the visibility of the indication marks is necessary. This enables the driver to control a working machine such as a construction machine and have additional information about the construction machine without any trouble in the driving.

12 Claims, 14 Drawing Sheets

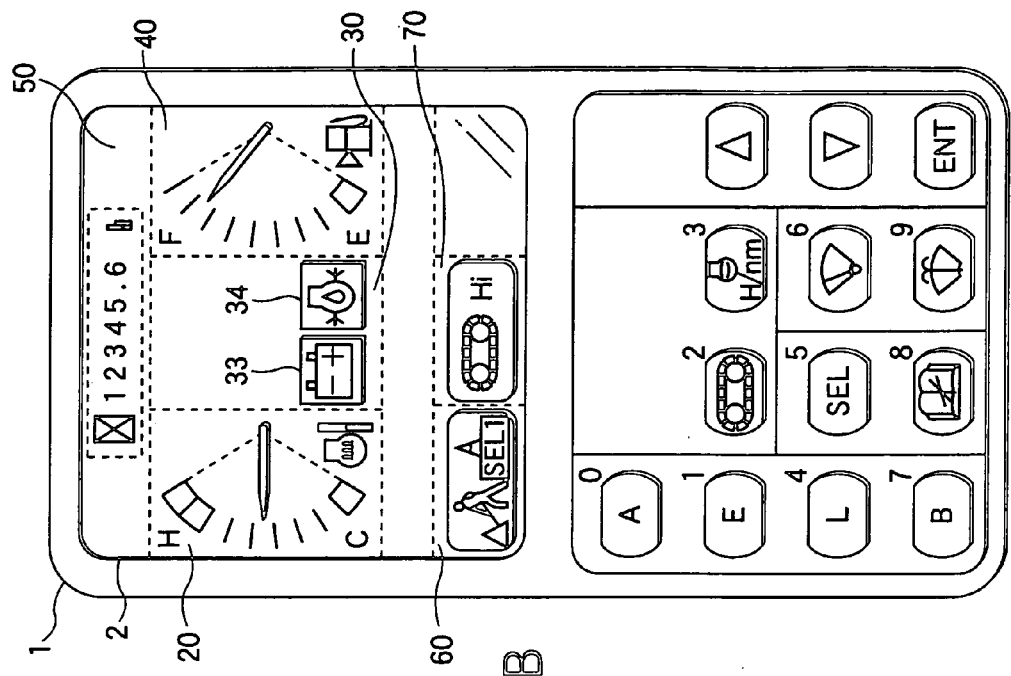
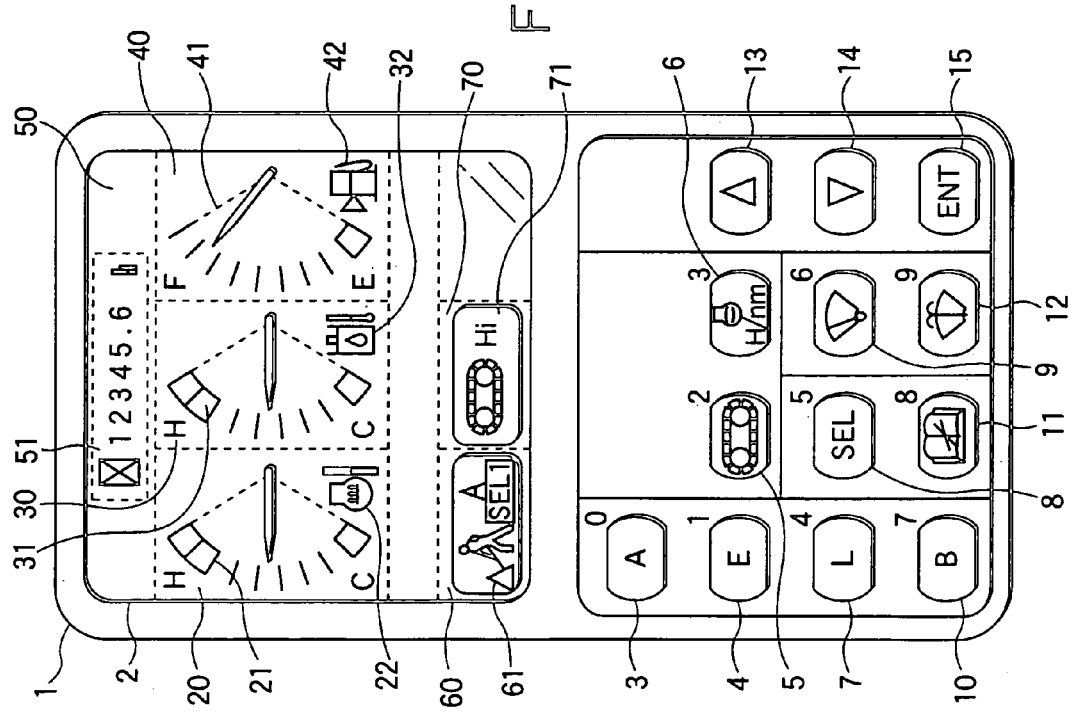

DISPLAY DEVICE FOR WORKING MACHINE

BACKGROUND OF THE INVENTION

1. Field of the Invention

The present invention relates to a display device which is mounted in the cabin of a working machine for displaying the state and change of the working machine.

2. Related Art

The construction machine is provided in its cabin with a display device for indicating the state of the construction machine such as a cooling water temperature and an abnormality such as a drop in an engine oil pressure. The display device of the prior art will be described with reference to FIG. 8.

On the display screen 81 of a display device 80, there are displayed a state indication mark 82 (in a bar graph) for indicating the state of the construction machine and a state change indication mark 83 for indicating a change having occurred in the working machine. For example, the state indication mark 82 for indicating the temperature of the cooling water of the engine and the residue of the fuel and the caution mark 83 for indicating abnormal values of a battery voltage, an engine oil pressure, a working oil temperature and a cooling water temperature are displayed as bar graphs in the segments of the common display screen 81.

The operator can recognize the fuel residue and the cooling water temperature at present from the displayed content of the state indication mark 82 displayed in the display screen 81 of the display device 80. The operator can further recognize the kind of the prevailing abnormality from the lighting state of the caution mark 83.

In recent years, the construction machine covers multiple functions so that the numbers of the state indication marks 82 and the caution marks 83 to be displayed in the common display screen 81 of the display device 80 are accordingly increased.

In the display device 80 of the prior art, the state indication mark 82 and the caution mark 83 are individually displayed in the independent display segments on the display screen 81.

As the numbers of the state indication marks 82 and the caution marks 83 increase, therefore, the individual mark sizes of the state indication marks 82 and the caution marks 83 have to be reduced so as to display all marks in the limited area of the display screen 81. As the sizes of the individual marks of the state indication marks 82 and the caution marks 83 are reduced, there arises a problem that the visibilities of the individual marks are degraded.

If the increases in the numbers of marks are accommodated with the sizes of the individual marks of the state indication marks 82 and the caution marks 83 being unchanged from those of the prior art, on the contrary, the area of the display screen 81 has to be made larger than that of the prior art. This invites an enlargement of the display device 80.

However, the cabin of the construction machine generally has a limited space to make it unpreferable to enlarge the size of the display device 80.

Thus, the display device 80 of the prior art has a problem that the increase in the number of marks without any enlarged size cannot be performed without lowering the visibilities of the marks.

In Unexamined Published Japanese Patent Application No. 9-78636, on the other hand, there is disclosed an invention, in which the information necessary for controlling the construction machine such as the fuel residue, the cooling water temperature or the engine oil pressure is displayed as the state indication mark on the display screen when no abnormality occurs in the construction machine and in which the state indication mark being displayed is made unindicative but only the caution mark is displayed on the display screen when an abnormality occurs in the construction machine.

Thus, on the display screen, only one of the state indication mark and the caution mark is selectively displayed, but it is unnecessary like the display device 80 of FIG. 8 to display both the state indication mark 82 and the caution mark 83 on the common screen. Even if the number of marks increases, therefore, the individual marks can be arranged without any size reduction in the limited display area thereby to prevent the drop in the visibility.

According to the invention disclosed in Unexamined Published Japanese Patent Application No. 9-78636, however, the state indication mark is made unindicative when an abnormality occurs in the construction machine. From the following reasons, therefore, there arises a problem that the construction machine becomes difficult to drive and control.

By observing the state indication mark the operator can grasp an abnormality to occur in the construction machine at an early stage.

According to the invention of the above-specified Unexamined Publication, when an abnormality occurs in the construction machine, the state indication mark is made unindicative, but only the caution mark is displayed on the display screen. Alternatively, it is possible to alternately repeat the state, in which not the state indication mark but only the caution mark is displayed on the display screen, and the state in which not the caution mark but only the state indication mark is displayed.

In either case, however, there arises a state in which the operator cannot observe the state indication mark. If the state indication mark is made unindicative, therefore, it is impossible to grasp such an abnormality at an early state as will occur in the fuel residue, the cooling water temperature or the engine oil pressure. It is also impossible to grasp an abnormality, if it occurs in the fuel residue, the cooling water temperature or the engine oil pressure, when the caution mark is displayed.

On the other hand, the caution mark is exemplified by the caution mark for indicating, when lit, a heavy abnormality requiring a quick response by stopping the driving control and by the caution mark for indicating, even if lit, a light abnormality not requiring a quick response always. The light abnormality is exemplified by a working oil temperature rise.

Even when the caution mark for indicating the light abnormality is lit and displayed on the display screen, the operator frequently continues the driving control of the construction machine thereby to continue the actions of the running equipment and the working equipment of the construction machine.

When a light abnormality occurs in the construction machine, according to the invention of the Publication, the display screen is switched from the display of the state indication mark to the display of the caution mark like when a heavy abnormality occurs. Therefore, the operator is compelled to continue the driving control with the display screen displaying only the caution mark but not the state indication mark. Of the state indication marks, some display the important information for the driving control which displays working condition such as the running state of the running equipment or the working state of the working equipment. These are the state indication mark for indicating the speed setting (e.g., a high speed (Hi), a medium speed (Mi) and a low speed (Lo)) of the hydraulic motor and the state indication mark for indicating the working mode (e.g., a heavy excavate, an excavate, a calibrate or a fine control) being selected.

Where the state indication mark for indicating the speed setting of the hydraulic motor is not displayed, the operator has to control the running control lever while estimating the speed setting. If the operator controls the running control lever largely by making an erroneous estimation of the "low speed" although the speed setting of the hydraulic motor is at the "high speed" in fact, the crawler may turn at a high speed, contrary to the intention of the operator.

Where the state indication mark for indicating the working mode is not displayed, the operator has to control the control lever for the working equipment while estimating the working mode selected currently. When the operator makes an erroneous estimation of the "fine control" and controls the control lever for the working equipment largely although the working mode selected is the "heavy excavate" in fact so that a high flow rate can be fed to the hydraulic cylinder for the working equipment, the working equipment (e.g., the boom, the arm or the bucket) may largely act at a high speed, although contrary to the intention of the operator.

SUMMARY OF THE INVENTION

The invention has been conceived in view of the practical situation and has a first object to make it possible to display both a state indication mark and a state change indication mark on a common display screen of a limited area without reducing their individual sizes even if their numbers increase, thereby to make neither a large size of the display device nor a reduction in the visibilities of the indication marks and to cause no trouble in the driving control of a working machine such as a construction machine.

In the works at the construction field, on the other hand, numerical values or letters are displayed in the display device of the construction machine so that the operator may control the levers or pedals while observing those numerical values or letters. Where materials are to be lifted with an arm crane having a hook at the bucket portion of a hydraulic shovel, for example, state indication marks for indicating the working radius, the lift, the rated load and the actual load are displayed on the display screen.

However, a plurality of state indication marks are displayed on the display screen so that the numerical values or letters are so small on the display screen of the limited area as to cause poor visibilities. Therefore, the operator has to gaze at those numerical values or letters to raise a problem that the operator cannot concentrate on the driving control of the working machine such as the construction machine.

The invention has been conceived in view of this practical situation and has a second object to improve the visibility of a specific state indication mark expressed by numerical values or letters thereby to prevent the driving control of the working machine such as the construction machine from being troubled.

In the display device 80 of FIG. 8, for example, a plurality of caution marks 831 to 83n have already been lit. Even if another new caution mark is lit, the operator may not find the fact that another caution mark 83n+1 has been lit. In this case, the operator fails to grasp the precise state of the construction machine.

Even if the caution mark 83n+1 indicates that the construction machine has to be quickly interrupted, therefore, the operator may continue the works to break the construction machine.

Even if the operator controls the switch erroneously to make a change to the undesired speed setting or working mode of the hydraulic motor, on the other hand, the operator may not find out the erroneous control. In this case, the operator has failed to grasp the speed setting or working mode of the hydraulic motor precisely.

If the operator controls the running control lever largely while being convinced that the speed setting has been changed to the "low speed" although the "high speed" in fact, for example, the crawler may turn at a high speed contrary to the intention of the operator. If the operator controls the running control lever largely while being convinced that the working mode selected currently has been changed to the "light excavate" although the "heavy excavate" in fact so that a high flow rate can be fed to the hydraulic cylinder for the working machine, on the other hand, the working equipment (e.g., the boom, arm or bucket) may act at a high speed although contrary to the intention of the operator.

The invention has been conceived in view of this practical situation and has a third problem to make it possible to call the caution of the operator when the display contents of state indication marks are changed and displayed and when the state indication marks are displayed.

In order to achieve the above-specified first object, according to a first aspect of the invention, there is provided a display device for a working machine, in which a state indication mark for indicating the state of the working machine is displayed in a display screen and in which a state change indication mark indicating a change in the state of the working machine is switched, when the state of the working machine makes a change, from an unindicative state to an indicative state and is displayed in said display screen, wherein, when the state of the working machine makes no change, a plurality of state indication marks are displayed in said display screen, and wherein, when the state of the working machine makes a change, a predetermined state indication mark, as displayed in a predetermined one of the individual display segments in said display screen, is made unindicative whereas said state change indication mark is displayed in said predetermined display segment.

The first aspect of the invention will be described with reference to FIGS. 1A and 1B.

The display screen 2 of the case, in which the working machine has no change, is shown in FIG. 1A.

Where there is no change in the state of the working machine: the engine water temperature indication mark 21 indicating the engine water temperature is displayed in the display segment 20 of the display screen 2; the working oil temperature indication mark 31 indicating the working oil temperature is displayed in the display segment 30; and the fuel quantity indication mark 41 indicating the fuel quantity is displayed in the display segment 40. On the other hand: the service time indication mark 51 indicating the service time is displayed in the display segment 50; the working mode indication mark 61 indicating the working mode selected currently is displayed in the display segment 60; and the running speed indication mark 71 indicating the prevailing speed setting currently is displayed in the display segment 70.

Where a change occurs in the state of the working machine, as exemplified by a drop in the voltage of the battery or a drop in the oil pressure of the engine, the display screen 2 is switched from the state shown in FIG. 1A to the state shown in FIG. 1B.

As shown in FIG. 1B, the state indication marks 21, 41, 51, 61 and 71, as displayed in the display segments 20, 40, 50, 60 and 70, keep their displayed states. However, the working oil temperature indication mark 31, as displayed in the specific display segment 30, is made unindicative. In this specific display segment 30, moreover, there are displayed the battery caution mark 33 indicating an abnormality such as the battery voltage drop and the engine oil pressure caution mark 34 indicating an abnormality such as the engine oil pressure rise.

Therefore, the operator can acquire the information necessary for the driving controls from the displays of the individual state indication marks 21, 41, 51, 61 and 71 while recognizing the prevailing abnormalities from the lit displays of the caution marks 33 and 34. Moreover, not the specific state indication mark 31 but the caution marks 33 and 34 are displayed in the specific display segment 30 of the display screen 2 so that both the state indication marks and the caution marks can be displayed in the limited space of the display screen 2 without reducing their individual sizes even if the numbers of the state indication marks and the caution marks are increased.

According to the first aspect of the invention thus far described, the state indication marks 21, 31, 41, 51, 61 and 71 but not the caution marks 33 and 34 are displayed on the display screen 2 when the no change occurs in the state of the working machine, and the caution marks 33 and 34 are displayed in turn in the specific display segment 30 having displayed the specific state indication mark 31, when an abnormality occurs. Even if the numbers of the state indication marks and the state change indication marks increase, therefore, both the state indication marks and the state change indication marks can be simultaneously displayed on the common display screen 2 of the limited area without reducing their individual sizes. As a result, it neither enlarge the size of the display device 1 nor lower the visibilities of the marks. Even if the state changes, moreover, the state indication marks 21, 41, 51, 61 and 71 are reliably displayed so that the driving control is not troubled in the working machine such as the construction machine.

In order to achieve the above-specified first object, according to a second aspect of the invention, there is provided a display device for a working machine, in which a state indication mark for indicating the state of the working machine is displayed in a display screen and in which a state change indication mark indicating a change in the state of the working machine is switched, when the state of the working machine makes a state change, from an unindicative state to an indicative state and is displayed in said display screen, wherein, when the state of the working machine makes no change, said state change indication mark is displayed in a predetermined one of the individual display segments of said display screen whereas corresponding state indication marks are displayed in the individual display segments other than said predetermined one, and wherein, when the state of the working machine makes a change, said state change indication mark, as displayed in said predetermined display segment, is made unindicative whereas a predetermined state indication mark is displayed in said predetermined display segment.

The second aspect of the invention will be described with reference to FIG. 1A and FIG. 7.

When the working machine is turned ON, the pilot indication mark 35 indicating that the engine is being preheated, as shown in FIG. 7, is displayed in the display segment 30 of the display screen 2. When the preheating is completed so that there occurs a change of interruption of the preheating function, the pilot indication mark 35 of the display segment 30 becomes unindicative. When another state change indication mark becomes unindicative, moreover, the display screen 2 is switched to the state shown in FIG. 1A, so that the working oil temperature indication mark 31 is displayed in the display segment 30.

Thus, in the specific display segment 30 of the display screen 2, there are switched and displayed the specific state indication mark 31 and the pilot indication mark 35. Even if the state indication marks and the pilot indication marks are increased in numbers, therefore, both of them can be displayed without reducing their individual sizes in the limited space of the display screen 2. Therefore, there can be attained effects similar to those of the first aspect of the invention.

In the first or second aspect of the invention, according to a third aspect, the predetermined state indication mark displayed in said predetermined display segment has the lowest priority for the display of the state indication marks displayed in the individual display segments on said display screen.

According to the third aspect, there is displayed in the specific display segment 30 that indication mark 31 (or the working oil temperature indication mark 31) of the state indication marks 21 to 71 to be displayed in the individual display segments 20 to 70, which has the lowest priority for the display. When the state changes, the state indication mark 31 of the lowest priority, as has been displayed in the specific display segment 30, is made unindicative. When the state changes, therefore, the remaining state indication marks 21, 41, 51, 61 and 71 of the higher priority are left displayed so that the driving control can be continued while acquiring the information necessary for the driving controls of the caution mark from those displays.

In the first or second aspect of the invention, according to a fourth aspect, said working machine includes a running equipment and a working equipment, and in such one of the individual display segments on said display screen as excepting said predetermined display segment, there is displayed a state indication mark indicating the running state of the running equipment of said working machine and/or a state indication mark indicating the working state of the working equipment of said working machine.

Of the individual display segments 20 to 70 on the display screen 2, according to the fourth aspect, the display segments 60 and 70 excepting the specific display segment 30 display the state indication mark 61 and/or the state indication mark 71 (i.e., the working mode indication mark 61 and/or the running speed indication mark 71) indicating the working state (or the working mode) of the working equipment of the working machine such as the construction machine or the running state (or the speed setting) of the running equipment. Where an abnormality occurs, therefore, only the specific state indication mark 31 (or the working oil temperature indication mark 31) having been displayed in the specific display segment 30 is made unindicative, but those state indication marks 61 and 71 (i.e., the working mode indication mark 61 and the running speed indication mark 71) keep their display states. Even if a light abnormality occurs, therefore, the information necessary for the driving control can be acquired from the displays of the state indication marks 61 and 71 on the display screen 2 so that the driving control can be continued without any trouble.

In the first or second aspect of the invention, according to a fifth aspect, the predetermined state change indication mark is made to correspond to said predetermined state indication mark, and when a change corresponding to said predetermined state change indication mark occurs while the state change indication mark is being displayed in said predetermined display segment, not only the state change indication mark being displayed but also said predetermined state change indication mark is displayed in said predetermined display segment.

The fifth aspect will be described with reference to FIGS. 2A to 2C.

According to the fifth aspect, the specific state change indication mark 32 (i.e., the working oil temperature caution mark 32) is made to correspond to the specific state indication mark 31 (i.e., the working oil temperature indication mark 31). If an abnormality occurs when the state change indication mark is to be displayed on the display screen, the specific state indication mark 31 (i.e., the working oil temperature indication mark 31) and the specific state change indication mark 32 (i.e., the working oil temperature caution mark 32) having been displayed in the specific display segment 30 are made unindicative, and the state change indication marks 33 and 34 are displayed in place. When a change (e.g., the working oil temperature rise) corresponding to the specific state change indication mark 32 (i.e., the working oil temperature caution mark 32) occurs while the state change indication marks 33 and 34 are displayed in the specific display segment 30, moreover, not only the state change indication marks 33 and 34 being displayed but also the state change indication mark 32 (i.e., the working oil temperature caution mark 32) is displayed in the specific display segment 30.

According to the fifth aspect of the invention, if a corresponding change (e.g., the working oil temperature rise) occurs even when the specific state change indication mark 32 (i.e., the working oil temperature caution mark 32) is made unindicative in the specific display segment 30, the specific state change indication mark 32 (i.e., the working oil temperature caution mark 32) indicating that change is lit and displayed again in the specific display segment 30. As a result, the change can be reliably recognized from the display screen 2.

According to a sixth aspect of the invention, on the other hand, there is provided a display device for a working machine, in which a plurality of marks are displayed on a display screen, wherein, when a predetermined signal is inputted, a predetermined one of the plurality of marks being displayed on said display screen is made unindicative whereas a predetermined mark corresponding to said predetermined signal is displayed in the display segment in which said predetermined mark was displayed.

The sixth aspect will be described with reference to FIGS. 1A and 1B.

When a predetermined signal such as an abnormality signal detected by the sensor is inputted to the display device 1, a specific one (i.e., the working oil temperature indication mark) 31 of the plurality of marks displayed on the display screen 2 is made unindicative, and a predetermined mark corresponding to the predetermined signal such as the caution mark 33 is displayed in the display segment 30. Here, the predetermined signal should not be limited to the abnormality signal but may be exemplified by the control signals which are generated by controlling the switches 3 to 15.

According to the sixth aspect, there can be obtained effects similar to those of the first aspect.

In order to achieve the above-specified second object, according to a seventh aspect of the invention, there is provided a display device for a working machine, in which a plurality of marks are displayed on a display screen, wherein, when a predetermined control is made, at least one of the plurality of marks being displayed on said display screen is enlarged or reduced and displayed.

The seventh aspect will be described with reference to FIGS. 9A and 9B.

Where the display screen 2 is in the state shown in FIG. 9A, the operator pushes a switch for displaying the rated load indication mark 98 and the actual load indication mark 99, such as the switch 8. Then, the display screen 2 is switched from the state shown in FIG. 9A to the state shown in FIG. 9B.

The display segments 91 and 93 are reduced so that the engine water temperature indication mark 21 and the fuel quantity indication mark 41 are individually reduced and displayed.

The working oil temperature indication mark 31 and the working oil temperature caution mark 32, as having been displayed in the display segment 92 just before the pushing control of the switch 8, are made unindicative. As the display segments 91 and 92 are reduced, on the other hand, the display segment 92 is enlarged transversely of the drawing. In this display segment 92, there are displayed the rated load indication mark 98 and the actual load indication mark 99 according to the size.

On the other hand, the display screen 2 can also be switched from the state shown in FIG. 9B to the state shown in FIG. 9A. Where the display screen 2 is in the state shown in FIG. 9B, the operator pushes the switch for making the rated load indication mark 98 and the actual load indication mark 99 unindicative. Then, the display screen 2 is switched from the state shown in FIG. 9B to the state shown in FIG. 9A. The engine water temperature indication mark 21 and the fuel quantity indication mark 41 are enlarged and displayed, and the working oil temperature indication mark 31 and the working oil temperature caution mark 32 are displayed in the display segment 92.

Thus according to the seventh aspect, the state indication marks indicating the numerical values such as the rated load indication mark 98 and the actual load indication mark 99 can be enlarged and displayed with the state indication marks necessary for controlling the construction machine such as the engine water temperature indication mark 21 and the fuel quantity indication mark 41 being displayed on the display screen 2. Therefore, the visibilities of the specific state indication marks indicated by the numerical values or letters are improved so that the operator can recognize the state indication marks without gazing at their numerical values or letters. Therefore, the operator can concentrate on the driving operations of working machines such as construction machines.

By enlarging and displaying the small engine water temperature indication mark 21 or fuel quantity indication mark 41, on the contrary, it is possible to improve the visibilities of those marks.

According to an eighth aspect of the invention, there is provided a display device for a working machine, in which a plurality of marks are displayed on a display screen, wherein, when a predetermined signal is inputted, a predetermined mark being displayed in a predetermined display segment on said display screen is displayed in a reduced scale, and wherein a mark different from said reduced and displayed mark is displayed in a portion, where said predetermined mark is reduced, of said predetermined display segment.

The eighth aspect will be described with reference to FIGS. 10A and 10B.

When an abnormality such as the battery voltage drop occurs where the display screen 2 is in the state shown in FIG. 10A, the working oil temperature indication mark 31 and the working oil temperature caution mark 32 having been displayed in the display segment 92 are reduced and displayed. Moreover, the battery caution mark 33 is displayed in the portion, where the working oil temperature indication mark 31 is reduced, of the display segment 92.

Thus according to the eighth aspect, the specific indication mark 31, as displayed in the display screen 2, is not made unindicative, but another mark such as the caution mark 33 can be displayed. By thus displaying many marks in the single screen, the operator can obtain many information without switching the screen.

In order to achieve the above-specified third object, according to a ninth aspect of the invention, there is provided a display device for a working machine, in which a plurality of marks are displayed on a display screen and in which, when a predetermined signal is inputted, a predetermined mark corresponding to said predetermined signal is displayed in a display segment different from the display segment of said plurality of marks, wherein said predetermined mark is enlarged and displayed for a predetermined time period over the predetermined one of the plurality of marks displayed on said display screen.

The ninth aspect will be described with reference to FIGS. 12A to 12C.

Let it be assumed that where the hydraulic motor has a speed setting of the "high speed (Hi)", the operator pushes the switch for changing the speed setting of the hydraulic motor such as the switch 5 to switch the speed setting to the "low speed (Lo)". On the basis of the speed setting signal, the display screen 2 is then switched from the state shown in FIG. 12A to the state shown in FIG. 12B.

In the display segment 92, there is displayed for a predetermined period, e.g., 2 seconds the running speed indication mark 71L for shielding the working oil temperature indication mark 31 which has been displayed just before the switch 5 is pushed. Moreover, the running speed indication mark 71 of the display segment 96 is displayed as "Lo".

After lapse of a predetermined time period such as 2 seconds after the pilot indication mark 102L is displayed in the display segment 91, the display screen 2 is switched from the state shown in FIG. 12B to the state shown in FIG. 12C.

In the display segment 92, the running speed indication mark 71L having shielded the working oil temperature indication mark 31 is made unindicative, but the working oil temperature indication mark 31 is displayed.

Here, the predetermined signal may be an abnormality signal to be detected by a sensor. In this case, the caution mark is displayed in the display segment.

Thus according to the ninth aspect, when the contents of the state indication marks 61 and 71 are to be changed, for example, the marks to be displayed are enlarged and displayed for a predetermined time period in the display segment 92 thereby to call the caution of the operator. Therefore, the operator can grasp the latest state of the construction machine reliably.

BRIEF DESCRIPTION OF THE DRAWINGS

FIG. 1A is a view showing the exterior of a display device of the case in which a hydraulic shovel is not abnormal, and FIG. 1B is a view showing the exterior of the display device of the case in which the hydraulic shovel becomes abnormal;

DESCRIPTION OF THE PREFERRED EMBODIMENTS

Figure 2A:
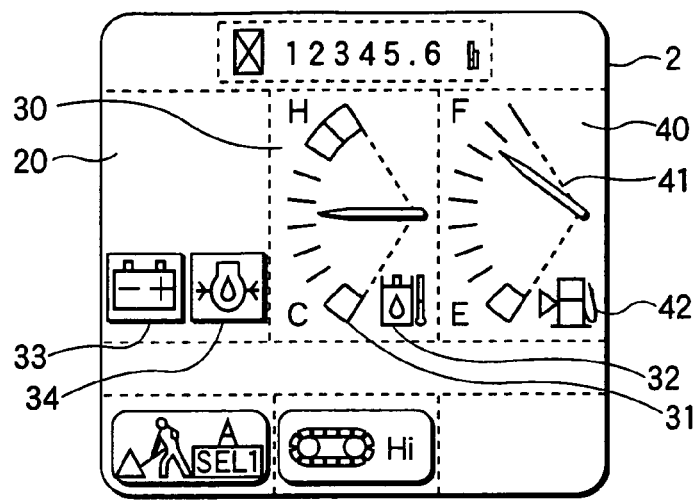
FIGS. 2A to 2C are views showing the states in which the display portions of caution marks move.

A display device for a working machine according to the invention will be described on a monitor panel to be used in a hydraulic shovel according to a first embodiment with reference to the accompanying drawings.

Here in this embodiment, the state change indication mark to be displayed on the display screen is preferably exemplified by a caution mark to be displayed where an abnormality occurs.

The hydraulic shovel is provided with a running equipment including a running control lever, a running hydraulic motor and a crawler. When the running control lever is controlled, more specifically, the running hydraulic motor is activated according to the control of the running control lever so that the crawler connected to the running hydraulic motor is driven according to the activation of the running hydraulic motor. On the other hand, the hydraulic shovel is provided with a working equipment including a working machine control lever, a working machine hydraulic cylinder and a working machine (e.g., a boom, an arm or a bucket). When the working machine control lever is controlled, more specifically, the working machine hydraulic cylinder is activated according to the control of the working machine control lever, so that the boom, the arm and the bucket connected to the working machine hydraulic cylinder are driven according to the activation of the working machine hydraulic cylinder.

FIGS. 1A and 1B show the exterior of a display device 1 of the embodiment. This display device 1 is equipped with a display screen 2 and switches 3 to 15. In other words, the display device 1 has a displaying function by the display screen 2 and inputting functions for inputting the control contents by pushing the switches 3 to 15.

The individual states of the water temperature of the cooling water, the temperature of the working oil, the quantity of the fuel and the running time. Moreover, the detected signals are inputted through the not-shown controller to the display device 1, and the prevailing states of the hydraulic shovel are displayed on the display screen 2 of the display device 1 on the basis of the hydraulic shovel.

By controlling the switches 3 to 15 mounted on the display device 1, on the other hand, control signals corresponding to the control contents are outputted to the not-shown controller for controlling the running equipment and the working equipment of the hydraulic shovel thereby to control the working state and the running state such as the working mode and the running speed. By controlling the switches 3 to 15 properly, the speed of the engine and the capacity of the hydraulic pump are controlled to control the flow rate of the pressure oil to be fed to the working machine hydraulic cylinder. Therefore, it is possible to select the relation between the control of the working machine control lever and the working quantity of the working machine (i.e., the boom, the arm and the bucket), that is, the working mode into any of the "heavy excavate", the "excavate", the "calibrate" and the "fine control". By controlling the switches 3 to 15 properly, on the other hand, there are controlled the capacity of the hydraulic pump and the capacity of the running hydraulic motor. It is, therefore, possible to select the running speed into any of the "high speed (Hi)", the "medium speed (Mi)" and the "low speed (Lo)". On the display screen 2, there are displayed the working mode being selected currently and the set speed (or the running speed)" being selected, as will be described hereinafter.

The display screen 2 is constructed of a liquid crystal display screen.

On the display screen 2, there are displayed state indication marks 21, 31, 41, 51, 61 and 71 indicating the states of the hydraulic shovel and caution marks 22, 32, 42, 33 and 34 for indicating abnormalities having occurred in the hydraulic shovel.

In other words, the display screen 2 is divided into individual display segments 20, 30, 40, 50, 60 and 70.

The display segment 20 is made correspond to the engine water temperature indication mark 21 and the engine water temperature caution mark 22. On the other hand, the display segment 40 is made to correspond to the fuel quantity indication mark 41 and the fuel quantity caution mark 42, and the display segment 50 is made to correspond to the service time indication mark 51. The display segment 60 is made to correspond to the working mode indication mark 61, and the display segment 70 is made to correspond to the running speed indication mark 71.

On the other hand, the specific display segment 30 is made to correspond to the working oil temperature indication mark 31 and the working oil temperature caution mark 32 and further to the battery caution mark 33 and the engine oil pressure caution mark 34.

The engine water temperature indication mark 21 is equipped with a gauge for indicating the temperature of the cooling water of the engine, and indicates the prevailing water temperature value in terms of the angle of gauge inclination according to the detected water temperature value of a corresponding sensor. When the detected temperature value of the cooling water of the engine rises to reach an abnormal value, the engine water temperature caution mark 22 is lit in red, for example.

Likewise, the working oil temperature indication mark 31 is equipped with a gauge for indicating the temperature of the working oil of the hydraulic cylinder or the like, and indicates the prevailing oil temperature value in terms of the angle of gauge inclination according to the detected working oil temperature value of a corresponding sensor. When the detected temperature value of the working oil rises to reach an abnormal value, the working oil temperature caution mark 32 is lit in yellow, for example.

Likewise, the fuel quantity indication mark 41 is equipped with a gauge for indicating the fuel quantity in the fuel tank, and indicates the prevailing fuel quantity (or the fuel residue) in terms of the angle of gauge inclination according to the detected fuel quantity of a corresponding sensor. When the detected fuel quantity becomes a predetermined or less value, the fuel quantity caution mark 42 is lit in red, for example.

The service time indication mark 51 is displayed as the service time of the engine by a numerical value.

The working mode indication mark 61 displays the working mode selected currently, in a pictograph and is changed in the display mode according to the working mode selected.

Likewise, the running speed indication mark 71 displays the running gear stage (or the set speed of the running hydraulic motor) selected currently, in a pictograph and is changed in the display mode according to the running gear stage selected.

On the other hand, the battery caution mark 33 indicates an abnormality in the battery voltage and is lit for example, in red when the detected battery voltage value of the corresponding sensor rises or falls to reach an abnormal value. Likewise, the engine oil pressure caution mark 34 indicates an abnormality in the engine and is lit in red, for example, when the engine oil pressure value of the corresponding sensor falls to reach an abnormal value.

The contents to be indicated by the engine water temperature indication mark 21, the fuel quantity indication mark 41, the service time indication mark 51, the working mode indication mark 61 and the running speed indication mark 71 thus far described, are information necessary for driving and controlling the hydraulic shovel and have to be displayed on the display screen 2 at all times. The information on the working mode and the running speed to be indicated by the working mode indication mark 61 and the running speed indication mark 71 are especially important for the driving operations.

On the other hand, the content to be indicated by the working oil temperature indication mark 31 has the lowest priority for the indication compared to other state indication marks, i.e., the engine water temperature indication mark 21, the fuel quantity indication mark 41, the service time indication mark 51, the working mode indication mark 61 and the running speed indication mark 71. Even if the temperature of the working oil reaches an abnormal value, no special problem arises in the continuation of the driving control of the hydraulic shovel to continue the actions of the working machine.

In this embodiment, therefore, where an abnormality occurs in the hydraulic shovel, the working oil temperature indication mark 31 and the working oil temperature caution mark 32 of the lowest priority are made unindicative, and the caution marks 33 and 34 are lit and displayed in place in the display segment 30. Here will be described the actions of the display device 1 of FIG. 1.

Where no abnormality occurs in the hydraulic shovel: the engine water temperature indication mark 21 indicating the engine water temperature and the engine water temperature caution mark 22 are displayed in the display segment 20 of the display screen 2; the working oil temperature indication mark 31 indicating the working oil temperature and the working oil temperature caution mark 32 are displayed in the display segment 30; and the fuel quantity indication mark 41 indicating the fuel quantity and the fuel quantity caution mark 42 are displayed in the display segment 40. On the other hand: the service time indication mark 51 indicating the service time is displayed in the display segment 50; the working mode indication mark 61 indicating the working mode selected at present is displayed in the display segment 60; and the running speed indication mark 71 indicating the speed set at present is displayed in the display segment 70. When no abnormality occurs, the engine water temperature caution mark 22, the working oil temperature caution mark 32 and the fuel quantity caution mark 42 are not lit.

If there occurs in the hydraulic shovel such an abnormality as is caused by drops in the voltage of the battery and in the oil pressure of the engine, the display screen 2 is switched from the state shown in FIG. 1A to the state shown in FIG. 1B.

As shown in FIG. 1B, the individual state indication marks 21, 41, 51, 61 and 71 and the individual caution marks 22 and 42, as displayed in the display segments 20, 40, 50, 60 and 70, keep their displayed states. However, the working oil temperature indication mark 31 and the working oil temperature caution mark 32 having been in the specific display segment 30 come into the unindicative states. In this specific display segment 30, moreover, there are lit and displayed the battery caution mark 33 indicating the abnormality of the battery voltage drop and the engine oil pressure caution mark 34 indicating the abnormality of the engine oil pressure drop. Here in the case of either of these abnormalities, there is lit and displayed either of the battery caution mark 33 and the engine oil pressure caution mark 34.

Therefore, the operator can acquire the information necessary for the driving operations from the displayed contents of the individual state indication marks 21, 41, 51, 61 and 71 while recognizing the prevailing abnormalities from the lit displays of the caution marks 33 and 34, thereby to continue the driving operations. The operator interrupts driving operation and can deal with it properly. Moreover, not the working oil temperature indication mark 31 and the working oil temperature caution mark 32 but the caution marks 33 and 34 are displayed in the specific display segment 30 of the display screen 2. Even if the state indication marks and the caution marks increase in their numbers, therefore, both of them can be displayed together without being individually reduced in sizes in the limited space of the display screen 2.

According to this embodiment thus far described, where no abnormality occurs, the state indication marks 21, 31, 41, 51, 61 and 71 and the caution marks 22, 32 and 42 are displayed on the display screen 2, but the caution marks 33 and 34 are made unindicative. Where an abnormality occurs, the caution marks 33 and 34 are displayed in place of the working oil temperature indication mark 31 and the working oil temperature caution mark 32 in the specific display segment 30. Even the state indication marks and the caution marks increase in their numbers, therefore, they can be simultaneously displayed together on the same display screen 2 of the limited area without reducing the sizes of the individual marks. Therefore, it is invited to neither enlarge the size of the display device 1 nor lower the visibility of the marks. Even where an abnormality occurs, moreover, the state indication marks 21, 41, 51, 61 and 71 necessary for the driving operations are displayed to cause no trouble in the driving operations of the hydraulic shovel.

Here in this embodiment, the state indication mark having the lowest priority for the display is the working oil temperature indication mark 31. However, the invention should not be limited thereto but could be modified such that a state indication mark other than that of the working oil temperature is given the lowest priority so that it may be made unindicative when an abnormality occurs. When an abnormality occurs, for example, the engine water temperature indication mark 21 and the engine water temperature caution mark 22 may be made unindicative, and the battery caution mark 33 or the engine oil pressure caution mark 34 for indicating the abnormality may be displayed in place in the display segment 20.

In this embodiment, on the other hand, while an abnormality is occurring in the hydraulic shovel, the description has been made assuming that the working oil temperature indication mark 31 and the working oil temperature caution mark 32 are made completely unindicative. However, the invention should not be limited thereto, but the working oil temperature indication mark 31 and the working oil temperature caution mark 32 may be intermittently displayed even while the abnormality is occurring. If an abnormality occurs, for example, the engine water temperature indication mark 21 and the engine water caution mark 22, and the working oil temperature indication mark 31 and the working oil temperature caution mark 32 may be alternately displayed in the display segment 20. In response to the controls of the switches, on the other hand, the displays of the display segment 20 may be switched from the displays of the engine water temperature indication mark 21 and the engine water temperature caution mark 22 to the displays of the working oil temperature indication mark 31 and the working oil temperature caution mark 32, or from the displays of the working oil temperature indication mark 31 and the working oil temperature caution mark 32 to the displays of the engine water temperature indication mark 21 and the engine water temperature caution mark 22.

Even while an abnormality is occurring, moreover, the display of the display segment 30 may be switched by the control of the switches from the lit displays of the caution marks 33 and 34 to the displays of the working oil temperature indication mark 31 and the working oil temperature caution mark 32. When an abnormality occurs, the display screen 1 comes into the state shown in FIG. 1B. When the switch for switching the screen is controlled, the battery caution mark 33 and the engine oil pressure caution mark 34 having been lit and displayed in the display segment 30 are made unindicative. In this display segment 30, moreover, there are displayed the working oil temperature indication mark 31 and the working oil temperature caution mark 32 thereby to establish the state shown in FIG. 1A. In this case, the display of the display segment 30 may be switched again after a predetermined time period from the working oil temperature indication mark 31 and the working oil temperature caution mark 32 to the battery caution mark 33 and the engine oil pressure caution mark 34. When the switch is controlled or when a new abnormality occurs, on the other hand, the display of the display segment 30 may be switched again from the working oil temperature indication mark 31 and the working oil temperature caution mark 32 to the battery caution mark 33 and the engine oil pressure caution mark 34.

Figure 2B:
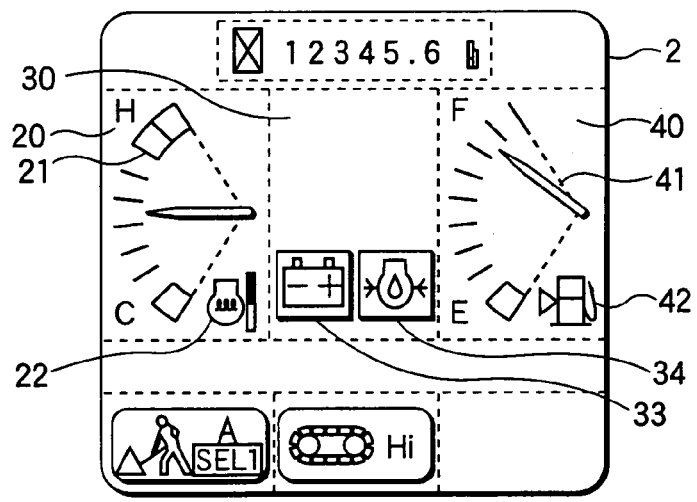
Figure 2C:
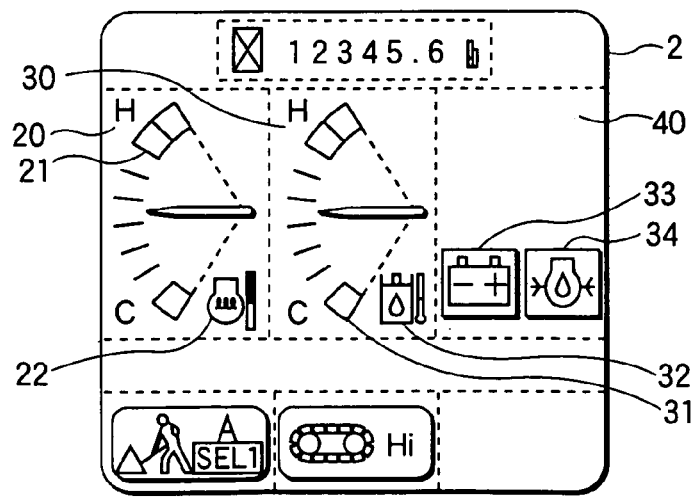

In this embodiment, on the other hand, the battery caution mark 33 and the engine oil pressure caution mark 34 are lit and displayed stationarily in the specific display segment 30. As shown in FIGS. 2A to 2C, these caution marks 33 and 34 may be lit and displayed alternately in the individual display segments 20, 30 and 40. This will be described with reference to FIGS. 2A to 2C.

If there occurs in the hydraulic shovel such an abnormality as is caused by drops in the voltage of the battery and in the oil pressure of the engine, the display screen 2 is switched from the state shown in FIG. 1A to the state shown in FIG. 2A. The engine water temperature indication mark 21 and the engine water temperature caution mark 22 having been displayed in the display segment 20 come into the unindicative state. In this display segment 20, moreover, there are lit and displayed the battery caution mark 33 and the engine oil pressure caution mark 34.

After a predetermined time period after the battery caution mark 33 and the engine oil pressure caution mark 34 were lit and displayed in the display segment 20, the display screen 2 is switched from the state of FIG. 2A to the state shown in FIG. 2B. The working oil temperature indication mark 31 and the working oil temperature caution mark 32 having been displayed in the display segment 30 are made unindicative. In this display segment 30, moreover, there are lit and displayed the battery caution mark 33 and the engine oil pressure caution mark 34. On the other hand, the battery caution mark 33 and the engine oil pressure caution mark 34 having been displayed in the display segment 20 are made unindicative. In this display segment 20, moreover, there are displayed the engine water temperature indication mark 21 and the engine water temperature caution mark 22.

After a predetermined time period after the battery caution mark 33 and the engine oil pressure caution mark 34 were lit and displayed in the display segment 30, the display screen 2 is switched from the state of FIG. 2B to the state shown in FIG. 2C. The fuel quantity indication mark 41 and the fuel quantity caution mark 42 having been displayed in the display segment 40 are made unindicative. In this display segment 40, moreover, there are lit and displayed the battery caution mark 33 and the engine oil pressure caution mark 34. On the other hand, the battery caution mark 33 and the engine oil pressure caution mark 34 having been displayed in the display segment 30 are made unindicative. In this display segment 30, moreover, there are displayed the working oil temperature indication mark 21 and the working oil temperature caution mark 22.

After a predetermined time period after the battery caution mark 33 and the engine oil pressure caution mark 34 were lit and displayed in the display segment 40, the display screen 2 is switched from the state of FIG. 2C to the state shown in FIG. 2A.

As described above, the display segment of the caution marks 33 and 34 is sequentially moved for every predetermined time periods from the display segment 20 to the display segment 30, from the display segment 30 to the display segment 40, and from the display segment 40 to the display segment 20.

On the other hand, the segments to display caution marks 33 and 34 may be switched in response to the controls of the switches. On the other hand, the segment to display the caution marks 33 and 34 at first may be made the display segment 30 having the lowest priority.

However, it is desired that the working mode indication mark 61 and the running speed indication mark 71 are always left displayed on the corresponding display segments 60 and 70 even when an abnormality occurs.

If the working mode indication mark 61 and the running speed indication mark 71 are only displayed at least on the display screen 2 when an abnormality occurs, the information necessary for the driving operations can be acquired from those displayed contents so that the driving operations can be continued without any serious trouble.

On the other hand, this embodiment has been described assuming that the working oil temperature caution mark 32 having been displayed in the specific display segment 30 when an abnormality occurs is made completely unindicative. Where an abnormality (e.g., a rise in the working oil temperature) corresponding to the unindicative working oil temperature caution mark 32 not having been indicated occurs, the working oil temperature caution mark indicating that abnormality may be lit and displayed together with the caution marks 33 and 34 in that specific display segment 30. This will be described with reference to FIG. 3.

Figure 3:
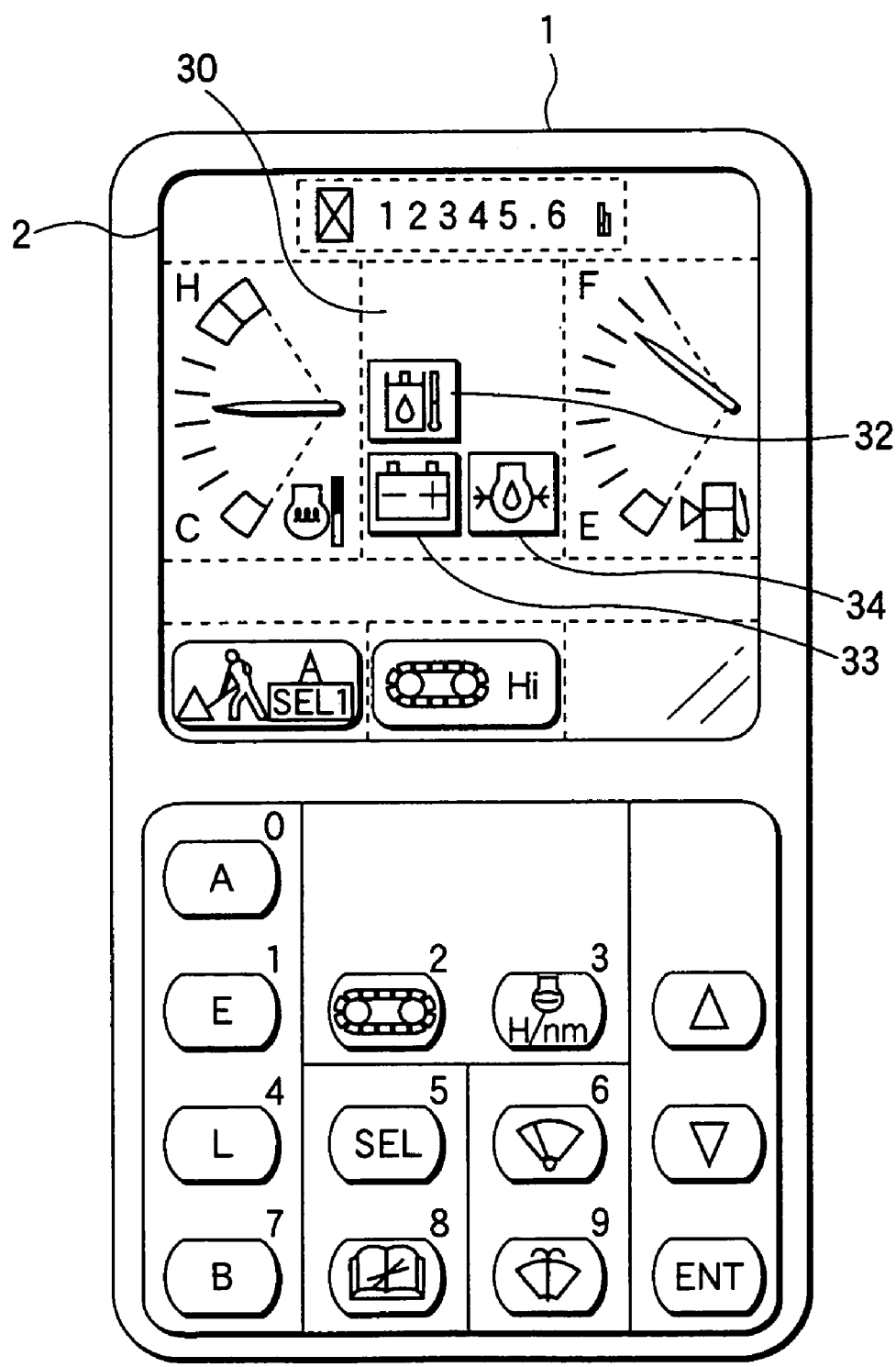
FIG. 3 is a view showing the exterior of the display device when the hydraulic shovel becomes abnormal not only in the battery voltage and the engine oil pressure but also in the working oil temperature rise.

When there occurs an abnormality such as a battery voltage abnormality or an engine oil pressure rise, as has been described with reference to FIG. 1B, the working oil temperature indication mark 31 and the working oil temperature caution mark 32 having been displayed in the specific display segment 30 become unindicative, but the battery caution mark 33 and the engine oil pressure caution mark 34 are lit and displayed in place. When an abnormality (e.g., a working oil temperature rise) corresponding to the unindicative working oil temperature caution mark 32 occurs while the battery caution mark 33 and the engine oil pressure caution mark 34 are being lit and displayed in that specific display segment 30, therefore, the display screen 2 is switched, as shown in FIG. 3. In the specific display segment 30, more specifically, the working oil temperature caution mark 32 is lit and displayed together with the battery caution mark 33 and the engine oil pressure caution mark 34 being displayed.

Figure 4:
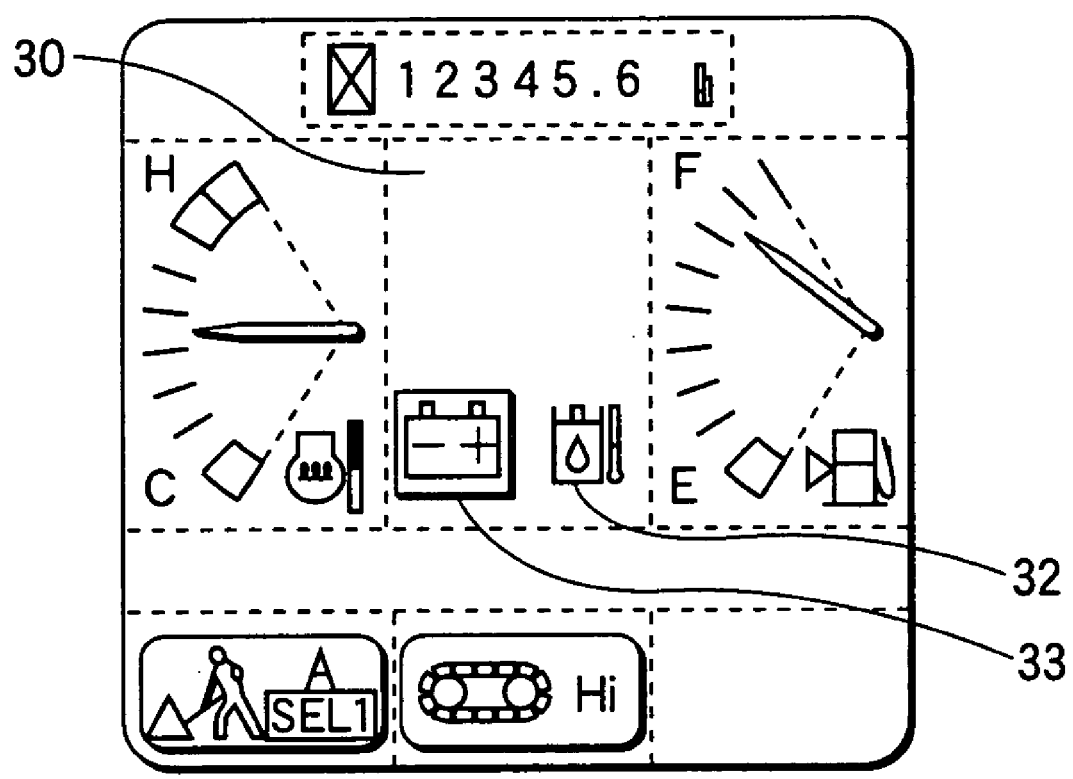
FIG. 4 is a view showing the display device when only a working oil temperature indication mark is not displayed but the caution marks are lit and displayed.

Thus, according to the embodiment shown in FIG. 3, if a corresponding abnormality (e.g., a working oil temperature rise) occurs although the working oil temperature caution mark 32 is unindicative in the specific display segment 30, the working oil temperature caution mark 32 indicating that abnormality is lit and displayed again in the specific display segment 30. Therefore, all the abnormalities occurring at present can be reliably recognized from the display screen 2.

Where an abnormality occurs in the hydraulic shovel, on the other hand, only the working oil temperature indication mark 31 of the display segment 30 may be made unindicative, as shown in FIG. 4. At this time, the battery caution mark 33 is lit and displayed in the display segment 30, and the working oil temperature caution mark 31 is displayed.

In the case of the embodiment shown in FIG. 4, when an abnormality such as the working oil temperature rise occurs, the working oil temperature caution mark 32 is lit and displayed together with the battery caution mark 33 in the display segment 30. It is, therefore, possible to grasp the abnormality such as the working oil temperature rise instantly.

Figure 5A:
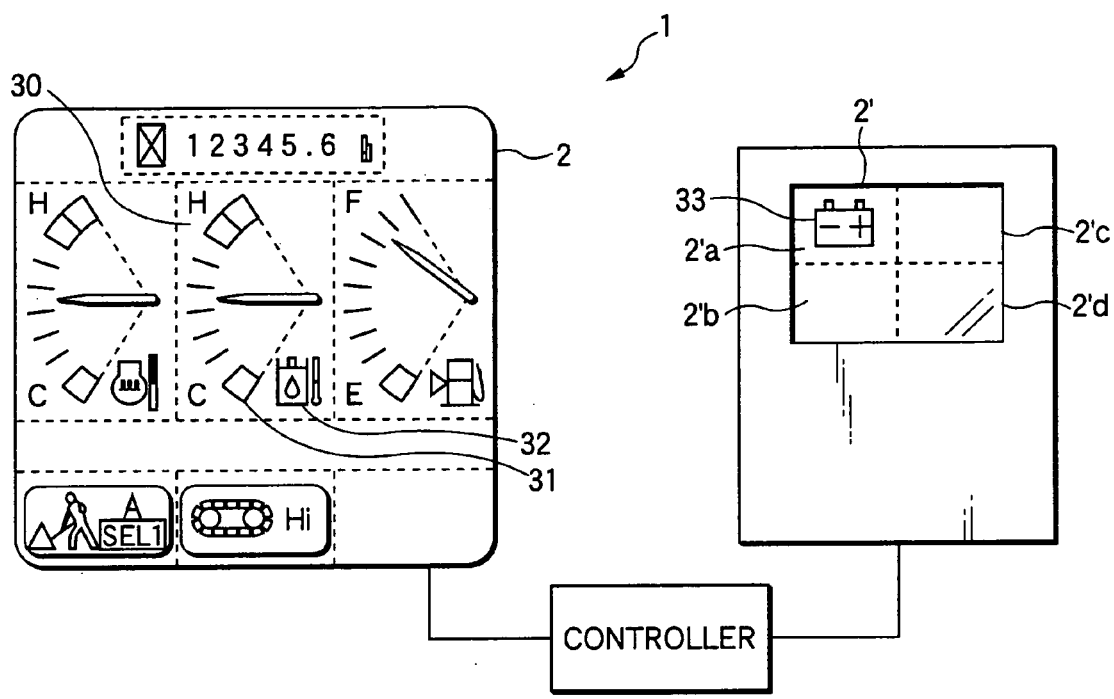
FIG. 5A is a view schematically showing a display device having a display screen for displaying state indication marks and a display screen for displaying four caution marks.

FIG. 5A shows a display device which is equipped separately with a display screen for displaying state indication marks and a display screen for displaying caution marks.

According to the embodiment shown in FIG. 5A, when there occurs in the hydraulic shovel an abnormality such as a drop in the battery voltage, the battery caution mark 33 is lit and displayed in a display segment 2'a of a caution display screen 2'. This caution display screen 2' is equipped with display segments 2'a, 2'b, 2'c and 2'd so that it can light and display caution marks up to four.

Figure 5B:
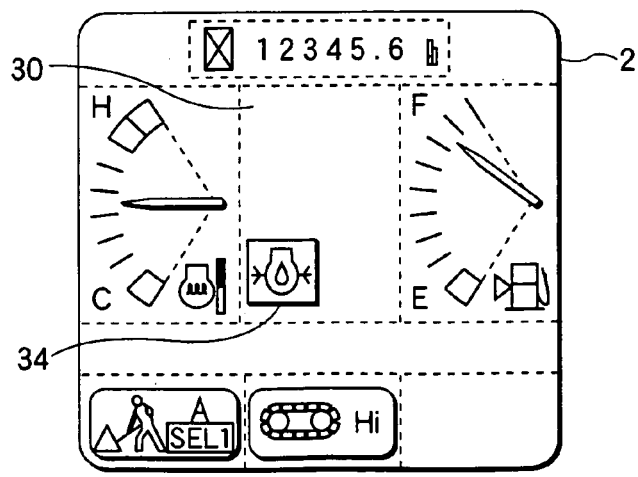
FIG. 5B is a view showing a display screen of the case in which a fifth abnormality occurs in the hydraulic shovel.

Here, it is imagined that five abnormalities simultaneously occur in the hydraulic shovel. If a fifth abnormality such as an engine oil pressure rise occurs in the hydraulic shovel, for example, the working oil temperature indication mark 31 and the working oil temperature caution mark 32 having been displayed in the display segment 30 of the display screen 2 are made unindicative, as shown in FIG. 5B. In this display segment 30, moreover, there is lit and displayed the engine oil pressure caution mark 34.

Figure 6A:
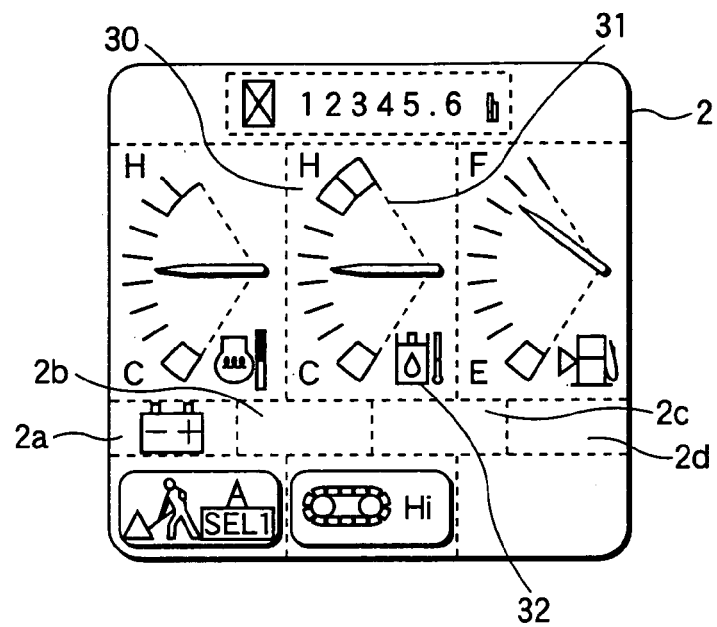
FIG. 6A is a view showing a display screen capable of displaying the state indication marks and the four caution marks simultaneously.
Figure 6B:
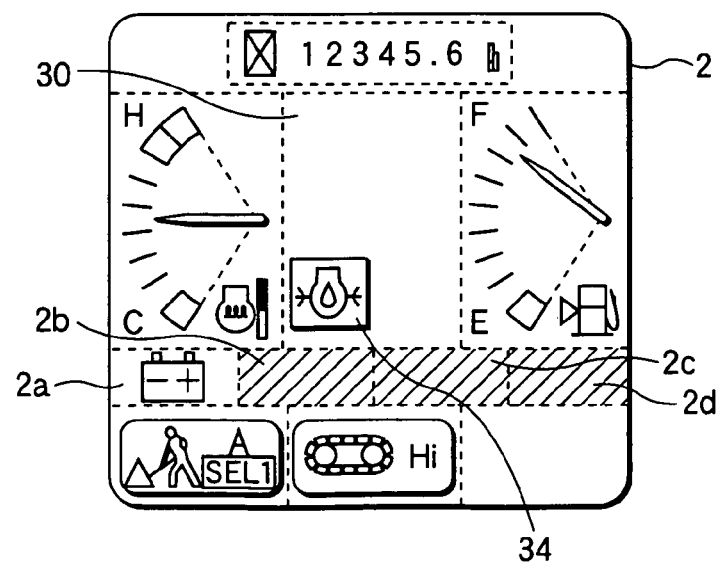
FIG. 6B is a view showing a display screen of the case in which the fifth abnormality occurs in the hydraulic shovel.

FIGS. 6A and 6B show display screens capable of displaying the state indication mark and the four caution marks.

According to the embodiment shown in FIG. 6A, if there occurs in the hydraulic shovel an abnormality such as a drop in the battery voltage, the battery caution mark 33 is lit and displayed in a display segment 2a of the caution display screen 2. This caution display screen 2 is equipped with display segments 2a, 2b, 2c and 2d so that it can light and display the caution marks up to four.

Here, it is imagined that five abnormalities simultaneously occur in the hydraulic shovel. If a fifth abnormality such as an engine oil pressure rise occurs in the hydraulic shovel, for example, the working oil temperature indication mark 31 and the working oil temperature caution mark 32 having been displayed in the display segment 30 of the display screen 2 are made unindicative, as shown in FIG. 6B. In this display segment 30, moreover, there is lit and displayed the engine oil pressure caution mark 34.

Here, the aforementioned embodiment has been described on the case in which the state change indication marks are the caution marks. However, the state change indication marks of the invention should not be limited to the caution marks but can be applied to various marks.

Figure 7:
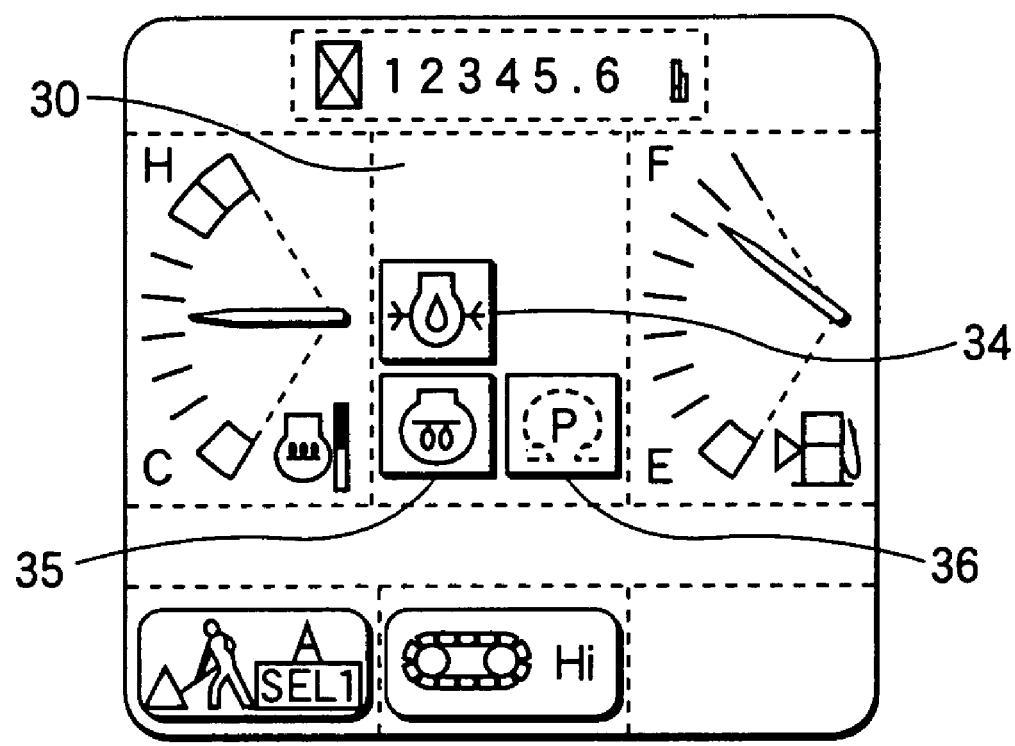
FIG. 7 is a display screen displaying the caution marks and a pilot indication mark.
Figure 8:
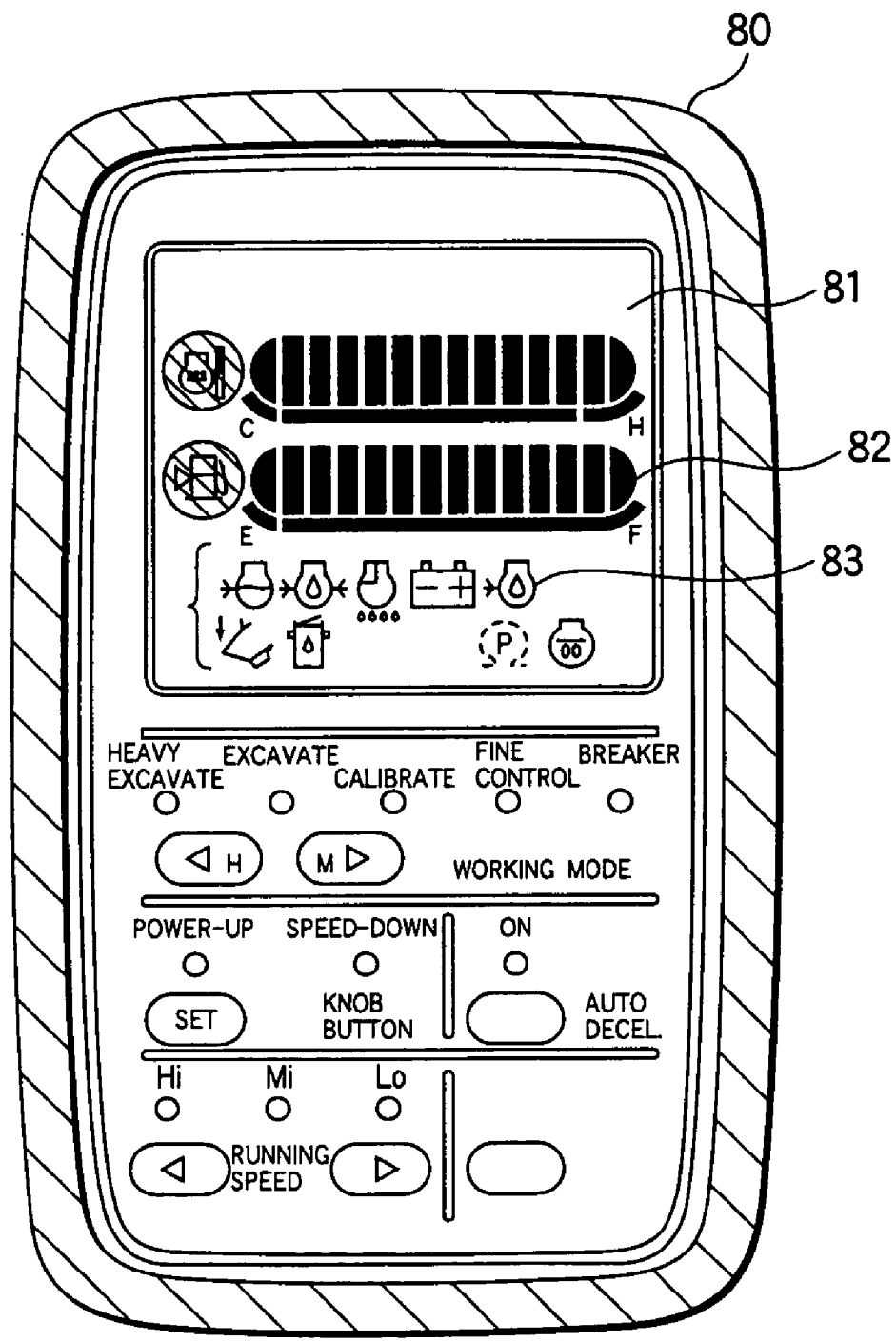
FIG. 8 is a view showing the exterior of a display device of the prior art.

As shown in FIG. 7, for example, pilot indication marks 35 and 36 indicating that the engine is being preheated or that the turning function is locked can be lit and displayed like the caution mark 34 in the display segment 30.

On the other hand, the pilot indication mark 35 indicating that the engine is being preheated is displayed where the preheating function of the engine acts but is not displayed where the preheating function is interrupted.

This embodiment has been described assuming that when a predetermined signal such as an abnormality signal detected by a sensor is inputted to the display device 1, a predetermined one (e.g., the working oil temperature indication mark) 31 of a plurality of marks displayed on the display screen is made unindicative whereas a predetermined mark such as the caution mark 33 corresponding to the predetermined signal is displayed in the display segment 30. However, the predetermined signal should not be limited to the abnormality signal but may be the control signals by the controls of the switches 3 to 15.

When the working machine is turned ON, there is displayed in the display segment 30 of the display screen 2 the pilot indication mark 35 which indicates that the engine is being preheated, as shown in FIG. 7. Where the preheat is completed to interrupt the preheating function, the pilot indication mark 35 of the display segment 30 is made unindicative. When another state change indication mark is made unindicative, moreover, the display screen 2 is switched to the state shown in FIG. 1A so that the working oil temperature indication mark 31 is displayed in the display segment 30.

On the other hand, the engine water temperature indication mark 21, the working oil temperature indication mark 31 and the fuel quantity indication mark 41 are of the pointer type in which the detected values by the individual sensors are indicated in terms of the angles of inclination of the gauges. However, those indication marks may be either of the bar type in which the detected values by the individual sensors are indicated in terms of the lengths of bars or of the digital type in which the detected values are indicated in terms of digits. On the other hand, the state change indication marks may also use letters.

Next, a second embodiment will be described with reference to FIGS. 9A and 9B.

In the second embodiment, the display device of the working machine according to the invention will be described on a monitor panel which is employed in an arm crane having a hook attached to the bucket portion of the hydraulic shovel, with reference to the accompanying drawings.

Figure 9A:
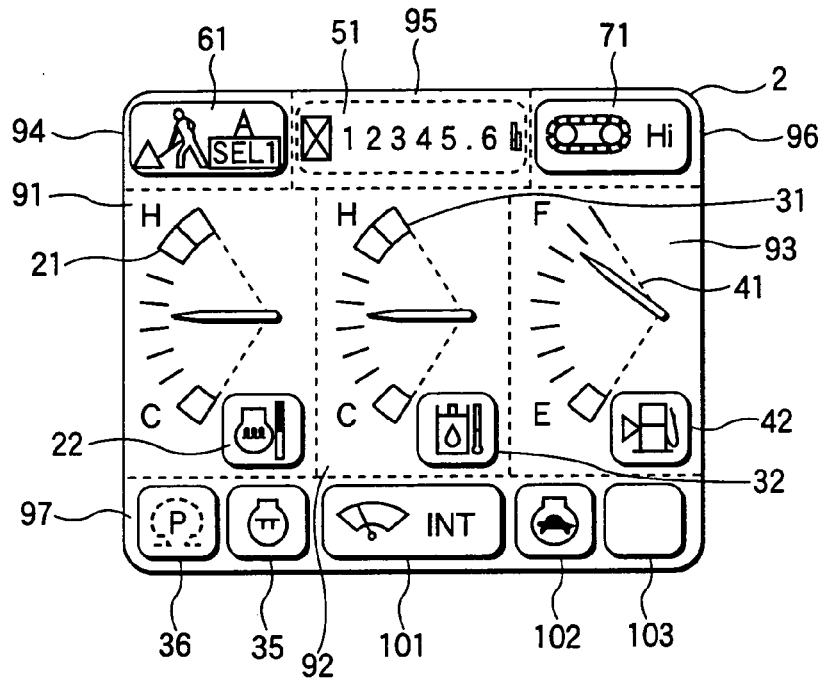
FIG. 9A is a view showing the display screen before switches are depressed.
Figure 9B:
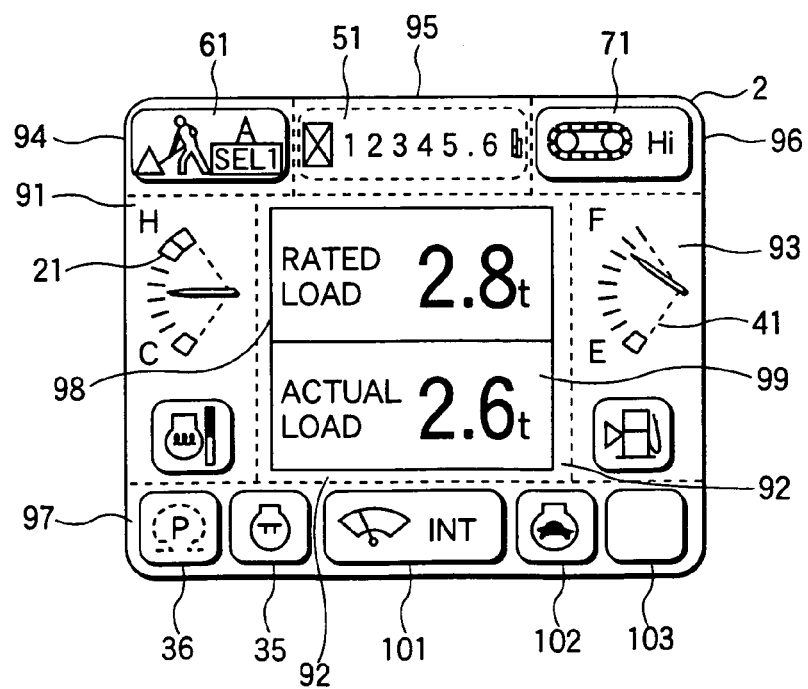
FIG. 9B is a view showing the display screen after the switches were depressed.

FIG. 9A is a view showing the display screen before switches are depressed, and FIG. 9B is a view showing the display screen after the switches were depressed.

Here, the screen construction of the display screen 2 shown in FIGS. 1A and 1B to FIG. 7 is different from that of the display screen 2 shown in FIGS. 9A and 9B. Of the individual state indication marks shown in FIGS. 9A and 9B, the same state indication marks as those shown in FIGS. 1A and 1B to FIG. 7 will be described by designating them by the common reference numerals.

On the display screen 2, there are displayed the state indication marks 21, 31, 41, 51, 61 and 71 indicating the states of the hydraulic shovel and the caution marks 22, 32 and 42 showing the abnormalities having occurred in the hydraulic shovel.

Specifically, the display screen 2 is divided into individual display segments 91, 92, 93, 94, 95, 96 and 97. By pushing the switch 8, the display segments 91 and 93 are reduced to display segments 91S and 93S, and the display segment 92 is enlarged to a display segment 92L.

The display segment 91 is made to correspond to the engine water temperature indication mark 21 and the engine water temperature caution mark 22; the display segment 93 is made to correspond to the fuel quantity indication mark 41 and the fuel quantity caution mark 42; and the display segment 94 is made to correspond to the working mode indication mark 61. The display segment 95 is made to correspond to the service time indication mark 51; the display segment 96 is made to correspond to the running speed indication mark 71; and the display segment 97 is made to correspond to the pilot indication marks 35, 36, 101, 102 and 103. The display segment 91S is made to correspond to the engine water temperature indication mark 21S and the engine water temperature caution mark 22, and the display segment 93S is made to correspond to a fuel quantity indication mark 41S and the fuel quantity caution mark 42.

On the contrary, the specific display segment 92 is made to correspond to the working oil temperature indication mark 31 and the working oil temperature caution mark 32. On the other hand, a display segment 92L is made to correspond to a rated load indication mark 104 and an actual load indication mark 105.

The pilot indication mark 35 is displayed where the engine is being preheated. The pilot indication mark 36 is displayed where the turning function is locked. The pilot indication mark 101 is displayed where the wiper is being activated. The pilot indication mark 102 is displayed where the deceleration function to suppress the noise by suppressing the speed of the engine is activated. The pilot indication mark 103 is displayed where the power-up function to increase the driving force by increasing the speed of the engine is activated.

The rated load indication mark 104 indicates the load, which is allowed where the wire is hooked on the hook attached to the bucket portion of the arm crane to raise materials, in numerical values. The actual load indication mark 105 indicates the actual load of the case, in which the materials or the like are raised, in numerical values.

Here will be described the actions of the display device 1 according to the second embodiment.

Where the display screen 2 is in the state shown in FIG. 9A, the operator depresses a switch for displaying a rated load indication mark 98 and an actual load indication mark 99, such as the switch 8 of the display device 1 shown in FIGS. 1A and 1B. Then, the display screen 2 is switched from the state shown in FIG. 9A to the state shown in FIG. 9B.

The individual indication marks 51, 61 and 71, as displayed in the display segments 94, 95 and 96, as shown in FIG. 9B, keep their states. In this embodiment, on the other hand, the individual indication marks 35, 36, 101 and 102, as displayed in the display segment 71, also keep their states.

The display segments 91 and 93 are reduced so that the engine water temperature indication mark 21 and the fuel quantity indication mark 41 are individually reduced and displayed.

The working oil temperature indication mark 31 and the working oil temperature caution mark 32, which have been displayed in the display segment 92 just before the switch 8 is depressed, become unindicative. In accordance with the reduction in the display segments 91 and 93, on the other hand, the display segment is enlarged transversely of the screen. In this display segment 92, there are displayed the rated load indication mark 98 and the actual load indication mark 99 according to the enlarged size.

Thus according to the second embodiment, the state indication marks indicating the numerical values such as the rated load indication mark 98 and the actual load indication mark 99 can be enlarged and displayed, while the state indication marks necessary for controlling the construction machine such as the engine water temperature indication mark 21 and the fuel quantity indication mark 41 being displayed on the display screen 2. Therefore, the visibility of the specific state indication marks, as indicated by the numerical values or letters, is improved so that the operator can recognize the state indication marks without observing their numerical values or letters. Therefore, the operator can concentrate on the driving operations of the working machine such as the construction machine.

Here, the state indication marks indicating the working radius and the lift may be displayed in the enlarged display segment 92. Not only the numerical values or letters but also the state indication marks according to the works may be displayed in the enlarged display segment 92.

When the rated load indication mark 98 and the actual load indication mark 99 are to be displayed on the display screen 2, on the other hand, the load factor may be displayed. For example, not only the rated load indication mark 98 and the actual load indication mark 99 but also the load factor indication mark is displayed in the display segment 51.

Of the individual indication marks displayed on the display screen 2, on the other hand, the unnecessary indication marks can be made unindicative, and the remaining indication marks can be enlarged and displayed. For example, the indication marks 35, 36 and 101 to 103 may be made unindicative, and the indication marks 21, 31 and 41 may be enlarged and displayed.

On the other hand, the display screen 2 can be changed from the state shown in FIG. 9B to the state shown in FIG. 9A. Where the display screen 2 is in the state shown in FIG. 9B, the operator pushes the switches for making the rated load indication mark 98 and the actual load indication mark 99 unindicative. Then, the display screen 2 is switched from the state shown in FIG. 9B to the state shown in FIG. 9A. The engine water temperature indication mark 21 and the fuel quantity indication mark 41 are enlarged and displayed, and the working oil temperature indication mark 31 and the working oil temperature caution mark 32 are displayed in the display segment 92.

The small engine water temperature indication mark 21 and fuel quantity indication mark 41 can be improved in their visibilities by enlarging and displaying the small indication marks 21 and 41.

Next, a third embodiment will be described with reference to FIGS. 10A and 10B and FIGS. 11A and 11B.

Figure 10A:
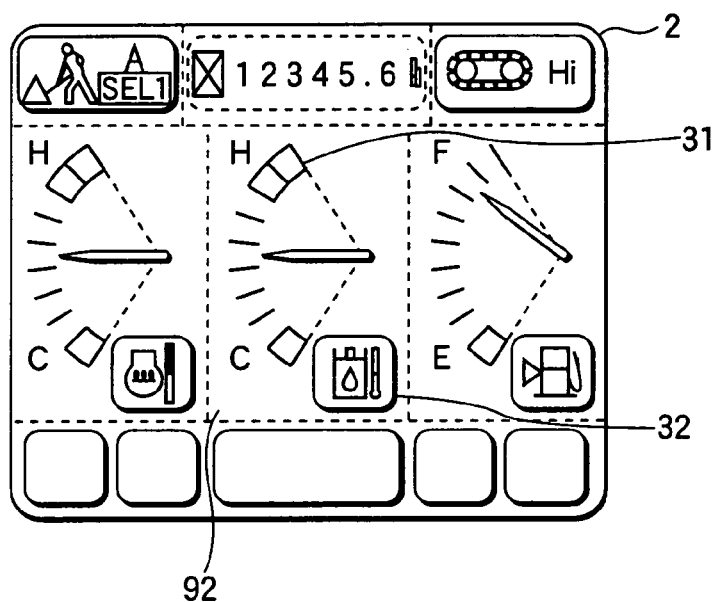
FIG. 10A is a view showing the display screen before a predetermined abnormality occurs.
Figure 10B:
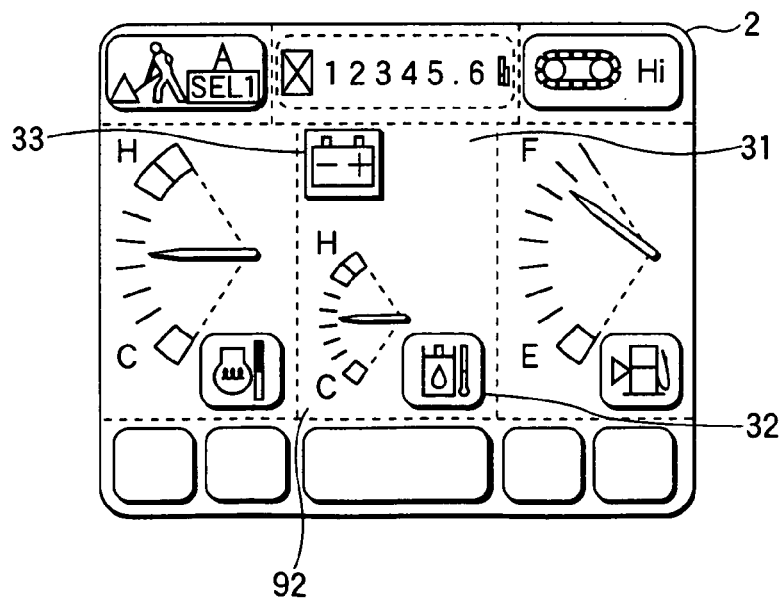
FIG. 10B is a view showing the display screen after the predetermined abnormality occurred.

FIG. 10A is a view showing the display screen before a predetermined abnormality occurs, and FIG. 10B is a view showing the display screen after the predetermined abnormality occurred.

If the battery voltage drops where the display screen 2 is in the state shown in FIG. 10A, there are reduced and displayed the working oil temperature indication mark 31 and the working oil temperature caution mark 32 which have been displayed in the display segment 92. Moreover, the battery caution mark 33 is displayed in that portion of the display segment 92, in which the working oil temperature indication mark 31 is reduced.

Figure 11A:
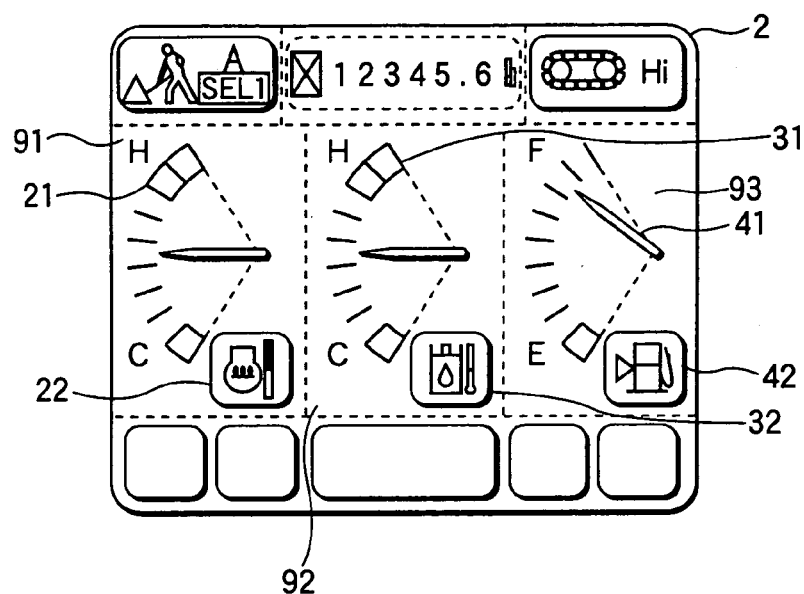
FIG. 11A is a view showing the display screen before a predetermined abnormality occurs.
Figure 11B:
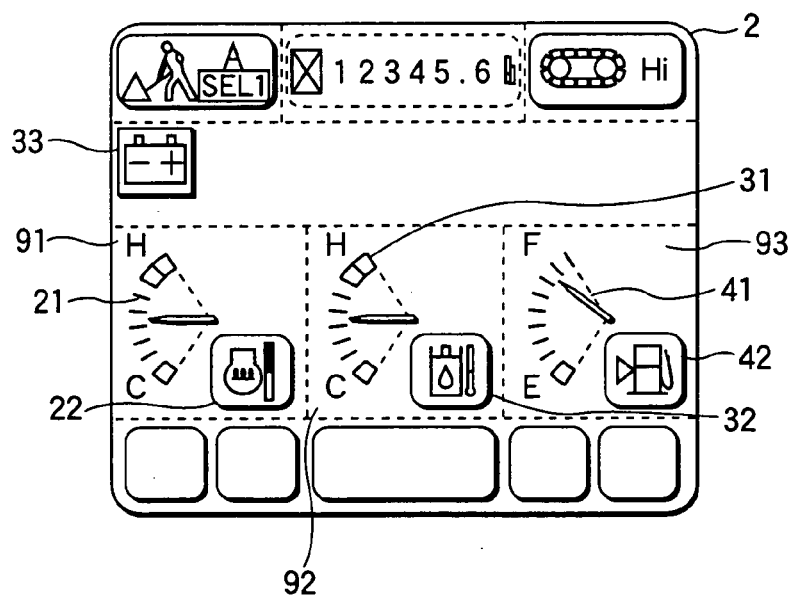
FIG. 11B is a view showing the display screen after the predetermined abnormality occurred.

FIG. 11A is a view showing the display screen before a predetermined abnormality occurs, and FIG. 11B is a view showing the display screen after the predetermined abnormality occurred.

If the battery voltage drops where the display screen 2 is in the state shown in FIG. 11A, there are reduced and displayed the engine water temperature indication mark 21 and the engine water temperature caution mark 22 which have been displayed in the display segment 91. On the other hand, there are reduced and displayed the working oil temperature indication mark 31 and the working oil temperature caution mark 32 which have been displayed in the display segment 92. On the other hand, there are reduced and displayed the fuel quantity indication mark 41 and the fuel quantity caution mark 42 which have been displayed in the display segment 93.

Thus according to the third embodiment, the indication mark 31 displayed on the display screen 2 is not made unindicative, but another mark such as the caution mark 33 can be displayed. By thus displaying the many marks in the single screen, the operator can acquire the many information without switching the screen.

By reducing the plurality of indication marks 21, 31 and 41, moreover, it is possible to display more marks. On the other hand, it is also possible to display the marks in larger sizes.

Next, a fourth embodiment will be described with reference to FIGS. 12A to 12C to FIGS. 14A to 14C.

In the following fourth embodiment, the display device of the working machine according to the invention will be described on a monitor panel which is employed in the hydraulic shovel, with reference to the accompanying drawings.

Figure 12A:
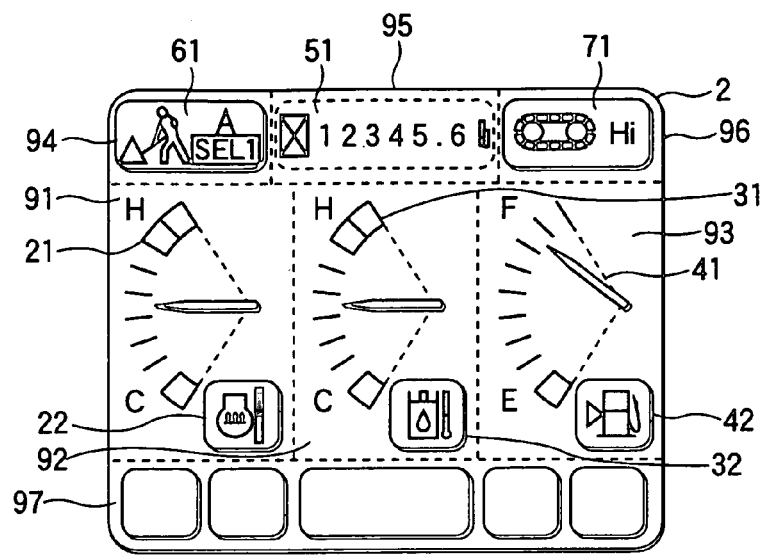
FIG. 12A is a view showing the display screen before the switch depression.
Figure 12B:
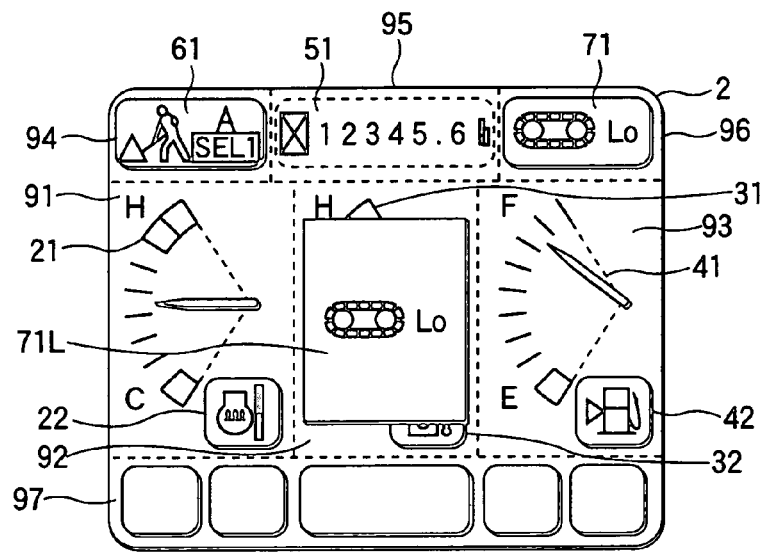
FIG. 12B is a view showing the display screen just after the switch depression.
Figure 12C:
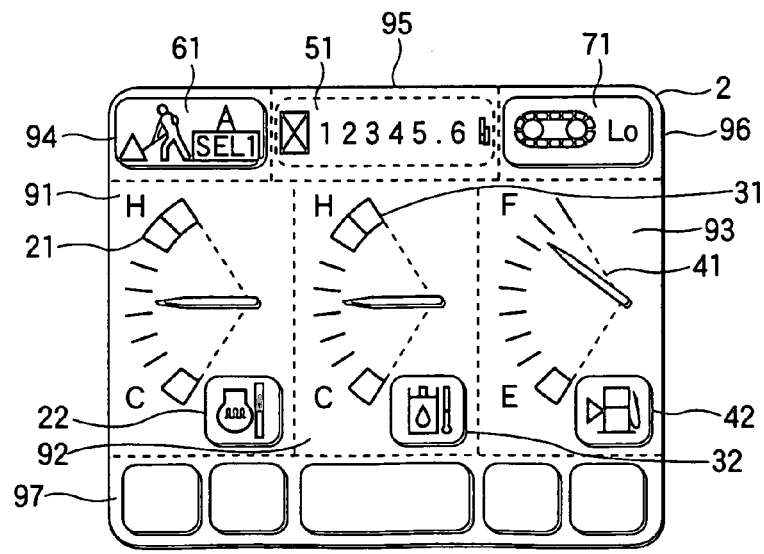
FIG. 12C is a view showing the display screen after lapse of a predetermined time period after the switch depression.

FIG. 12A is a view showing the display screen before the switch depression; FIG. 12B is a view showing the display screen just after the switch depression; and FIG. 12C is a view showing the display screen after lapse of a predetermined time period after the switch depression.

Figure 13A:
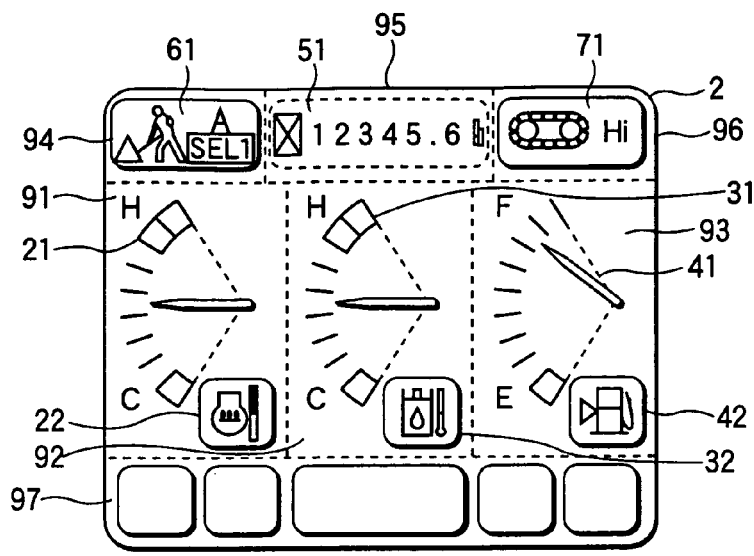
FIG. 13A is a view showing the display screen before the switch depression.
Figure 13B:
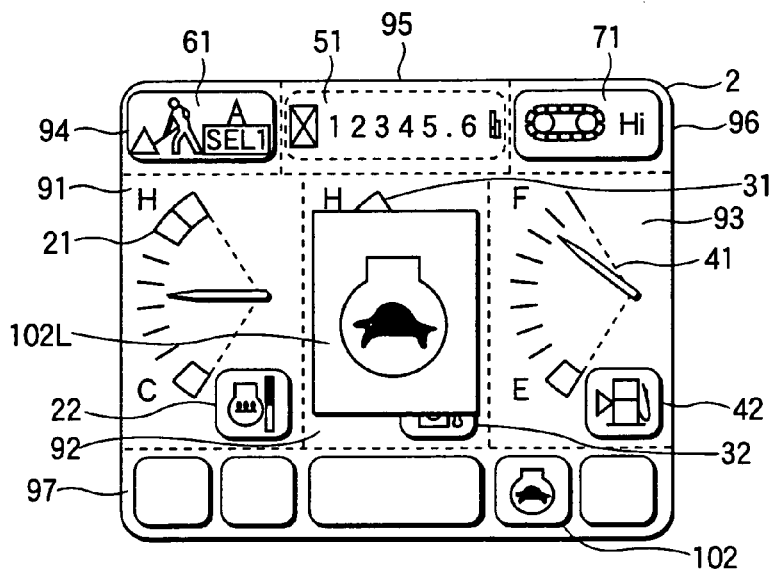
FIG. 13B is a view showing the display screen just after the switch depression.
Figure 13C:
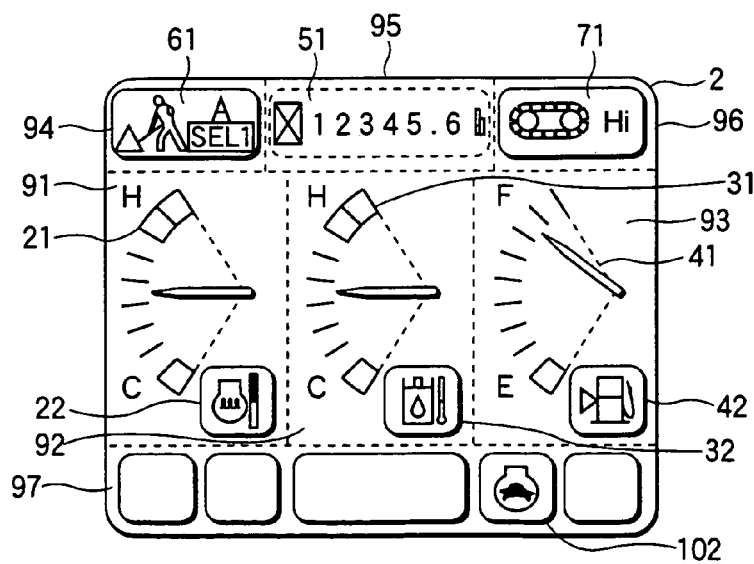
FIG. 13C is a view showing the display screen after lapse of a predetermined time period after the switch depression.

FIG. 13A is a view showing the display screen before the switch depression; FIG. 13B is a view showing the display screen just after the switch depression; and FIG. 13C is a view showing the display screen after lapse of a predetermined time period after the switch depression.

Figure 14A:
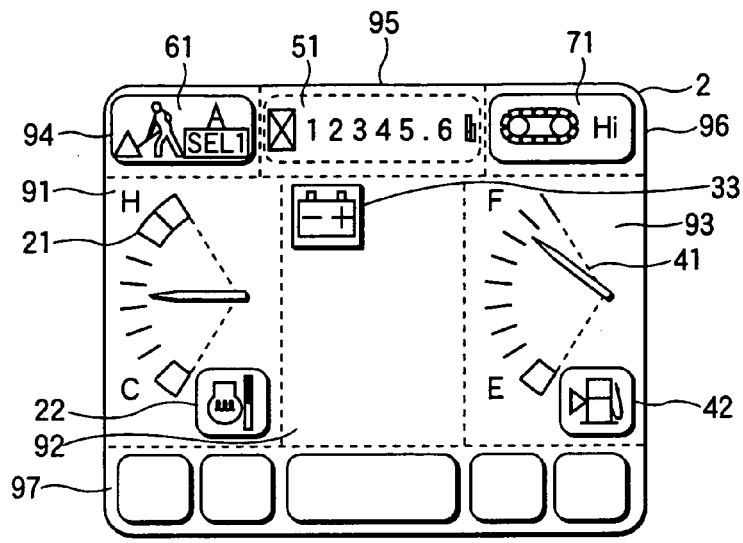
FIG. 14A is a view showing the display screen before the occurrence of a predetermined abnormality.
Figure 14B:
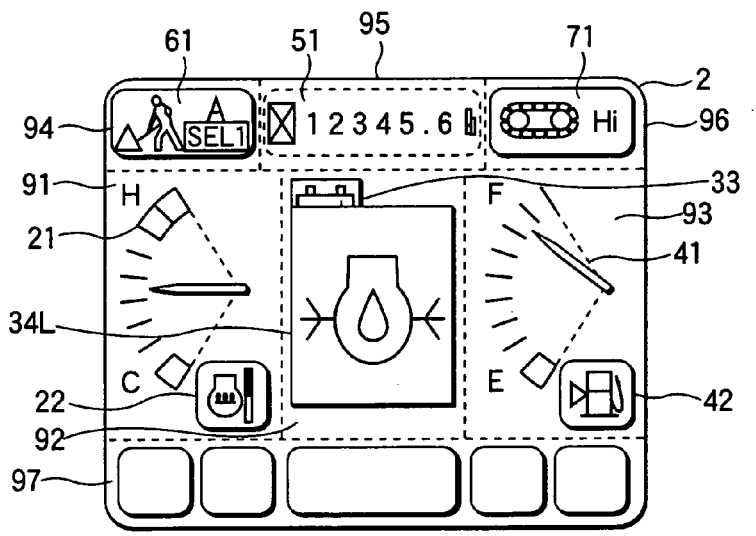
FIG. 14B is a view showing the display screen just after the occurrence of the predetermined abnormality.
Figure 14C:
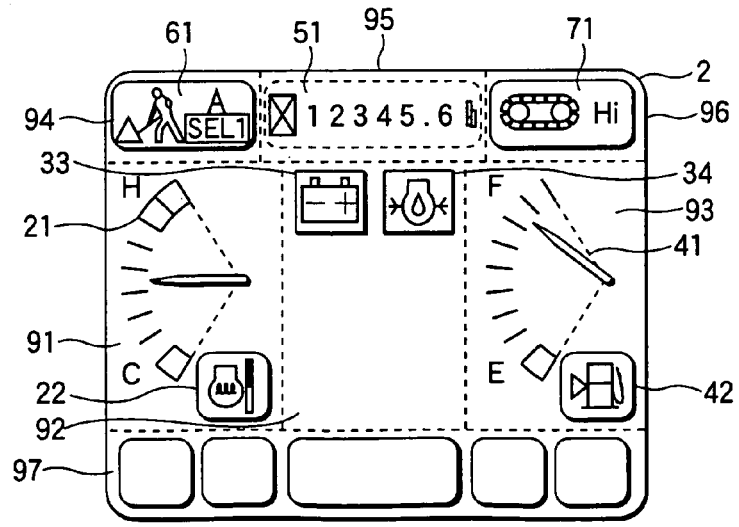
FIG. 14C is a view showing the display screen after lapse of a predetermined time period after the occurrence of the predetermined abnormality.

FIG. 14A is a view showing the display screen before the occurrence of a predetermined abnormality; FIG. 14B is a view showing the display screen just after the occurrence of the predetermined abnormality; and FIG. 14C is a view showing the display screen after lapse of a predetermined time period after the occurrence of the predetermined abnormality.

In the fourth embodiment, the specific display segment 92 is made to correspond to the working oil temperature indication mark 31 and the working oil temperature caution mark 32, an enlarged state indication mark 71L shown in FIG. 12B, an enlarged pilot indication mark 102L shown in FIG. 13B, and an enlarged caution mark 34L shown in FIG. 14B.

With reference to FIG. 12, here will be described the actions of the display device 1 of the case in which the operator controls the switch to change the speed setting of the hydraulic motor.

Let it be assumed that where the speed of the hydraulic motor is set to "high speed (Hi)", the switch for changing the speed setting of the hydraulic motor, e.g., the switch 5 of the display device 1 shown in FIG. 1 is pushed by the operator to switch the speed setting to the "low speed (Lo)". Then, the display screen is switched from the state shown in FIG. 12A to the state shown in FIG. 12B.

As shown in FIG. 12B, the individual indication marks 21, 41, 51 and 61, as displayed in the display segments 91, 93, 94 and 95, kept their states. Here in FIG. 12A, the individual pilot indication marks 35, 36, 101, 102 and 103 are not displayed in the display segment 97. Where one of those indication marks is displayed, however, the state is kept.

In the display segment 92, the running speed indication mark 71L is so displayed for a predetermined time period, e.g., for 2 seconds as to shield the working oil temperature indication mark 31 which has been displayed just before the depression of the switch 5. Moreover, the running speed indication mark 71 of the display segment 96 is displayed as "Lo".

After lapse of a predetermined time period, e.g., 2 seconds after the pilot indication mark 71L was displayed in the display segment 92, the display screen 2 is switched from the state shown in FIG. 12B to the state shown in FIG. 12C.

As shown in FIG. 12C, the individual indication marks 21, 41, 51, 61 and 71, as displayed in the display segments 91, 93, 94, 95 and 96, keep their states. Here in FIG. 12B, the individual pilot indication marks 35, 36, 101, 102 and 103 are not displayed in the display segment 97. In case one of these indication marks is displayed, however, the displayed state is kept.

In the display segment 92, the running speed indication mark 71L having shielded the working oil temperature indication mark 31 is made unindicative, but the working oil temperature indication mark 31 is displayed.

With reference to FIG. 13, here will be described the actions of the display device 1 of the case in which the deceleration function is activated by the switch control of the operator.

Where the deceleration function of the construction machine is not activated, the operator pushes the switch for activating the deceleration function. Then, the display screen 2 is switched from the state shown in FIG. 13A to the state shown in FIG. 13B.

As shown in FIG. 13B, the individual indication marks 21, 41, 51, 61 and 71, as displayed in the display segments 91, 93, 94, 95 and 96, keep their states.

In the display segment 92, the pilot indication mark 102L is so displayed for a predetermined time period, e.g., 2 seconds as to shield the working oil temperature indication mark 31 which has been displayed just before the pushing operation of the switch. Moreover, the pilot indication mark 102 is displayed at a predetermined portion of the display segment 97.

After lapse of a predetermined time period, e.g., 2 seconds after the pilot indication mark 102L was displayed in the display segment 92, the display screen 2 is switched from the state shown in FIG. 13B to the state shown in FIG. 13C.

As shown in FIG. 13C, the individual indication marks 21, 41, 51, 61, 71 and 102, as displayed in the display segments 91, 93, 94, 95, 96 and 97, keep their states.

In the display segment 92, the pilot indication mark 102L having shielded the working oil temperature indication mark 31 is made unindicative, and the working oil temperature indication mark 31 is displayed.

With reference to FIG. 14, here will be described the actions of the display device 1 of the case in which the engine oil pressure drops to an abnormal value.

Let it be that the construction machine is activated although an abnormality occurs such that the voltage of the battery drops. The display screen 2 of this case is shown in FIG. 14A. At this time, it is assumed that a new abnormality occurs to cause the engine oil pressure to drop, and that this abnormality is detected by the sensor. Then, the display screen 2 is switched from the state shown in FIG. 14A to the state shown in FIG. 14B.

The individual indication marks 21, 41, 51, 61 and 71, as displayed in the display segments 91, 93, 94, 95 and 96, as shown in FIG. 14B, keep their states. In FIG. 14A, the display segment 97 does not display the individual pilot indication marks 35, 36, 101, 102 and 103. If only one of them is displayed, the state is kept.

In the display segment 92, the engine oil pressure caution mark 34L is so displayed for a predetermined time period, e.g., 2 seconds as to shield the battery caution mark 33 which has been displayed just before the abnormality of the engine oil pressure is detected by the sensor.

After lapse of a predetermined time period, e.g., 2 seconds after the engine oil pressure caution mark 34L was displayed in the display segment 92, the display screen 2 is switched from the state shown in FIG. 14B to the state shown in FIG. 14C.

The individual indication marks 21, 41, 51, 61 and 71 having been displayed in the display segments 91, 93, 94, 95 and 96, as shown in FIG. 14C, keep their states. In FIG. 14B, the display segment 97 does not display the individual pilot indication marks 35, 36, 101, 102 and 103. If only one of them is displayed, the state is kept.

In the display segment 92, the engine oil pressure caution mark 34L is made unindicative, but the battery caution mark 33 and the engine oil pressure caution mark 34 are displayed.

Thus according to the fourth embodiment, the mark to be displayed is enlarged and displayed for the predetermined time period in the display segment 92 to call the caution of the operator, when the contents of the state indication marks 61 and 71 are changed, when the pilot indication marks 34, 35, 101, 102 and 103 are displayed on the display screen 2 or when the caution marks 33 and 34 are displayed on the display screen 2. Therefore, the operator can grasp the latest state of the construction machine reliably.

The foregoing embodiments have been described assuming that the display device is mounted on the hydraulic shovel or the arm crane. However, the display device of the invention can be used as the display device for all the working machine such as a machine tool.

What is claimed is:

1. A display device for a working machine, comprising:
   a display screen having a plurality of display segments;
   a plurality of state indication marks indicating working state of the working machine, each of the state indication marks being displayed in each of the display segments, and each of the state indication marks being associated with a display priority;
   means for detecting abnormality in the state of the working machine;
   means for determining a state indication mark having a lowest display priority;
   means for, responsive to a detected abnormality in the state of the working machine, displaying a caution mark indicating the detected abnormality, the caution mark being displayed at the display segment corresponding to the determined state indication mark having lowest display priority.

2. The display device for a working machine according to claim 1,
   wherein the working machine includes a running equipment and a working equipment, and
   wherein, in another of the display segments other than that displaying the predetermined state indication mark baying lowest display priority, at least one other state indication mark that indicates the running state and/or the working state of the working machine is displayed, and the display in the another of the display segments is not changed when the abnormality in the state of the working machine occurs.

3. The display device for a working machine according to claim 1,
   wherein, when a change corresponding to the caution mark occurs while the caution mark is being displayed, both the caution mark and one of the plurality of state indication marks are displayed in the display segment corresponding to the determined state indication mark having lowest display priority.

4. The display device for a working machine according to claim 1, wherein a display size of at least one of the plurality of state indication marks other than the predetermined state indication mark having lowest display priority is reduced.

5. The display device for a working machine according to claim 1, wherein the caution mark has an enlarged area compared to the predetermined state indication mark having lowest display priority.

6. A display device for a working machine, comprising:
   a display screen having a plurality of display segments;
   a controller displaying a plurality of state indication marks indicating working state of the working machine on the display screen, each of the state indication marks being displayed in each of the display segments, and each of the state indication marks being associated with a display priority, the controller:
   detecting abnormality in the state of the working machine,
   determining a state indication mark having a lowest display priority; and
   displaying a caution mark indicating the detected abnormality in response to a detected abnormality in the state of the working machine, the caution mark being displayed at the display segment corresponding to the determined state indication mark having lowest display priority.

7. The display device for a working machine according to claim 6,
   wherein the working machine includes a running equipment and a working equipment, and
   wherein, in another of the display segments other than that displaying the predetermined state indication mark having lowest display priority, at least one other state indication mark that indicates the running state and/or the working state of the working machine is displayed, and a display in the another of the display segments is not changed when the abnormality in the state of the working machine occurs.

8. The display device for a working machine according to claim 7,
   wherein, when a change corresponding to the caution mark occurs while the caution mark is being displayed, both the caution mark and one of the plurality of state indication marks are displayed in the display segment corresponding to the determined state indication mark having lowest display priority.

9. The display device for a working machine according to claim 7, wherein a display size of at least one of the plurality of state indication marks other than the predetermined state indication mark having lowest display priority is reduced.

10. The display device for a working machine according to claim 7, wherein the caution mark has an enlarged area compared to the predetermined state indication mark having lowest display priority.

11. A display device for a working machine, comprising:
    a display screen having a plurality of display segments;
    a plurality of state indication marks indicating working state of the working machine, each of the state indication marks being displayed in each of the display segments, and each of the state indication marks being associated with a display priority;
    means for receiving an input from a sensor arranged in the working machine that is independent of operator input;

means for determining a state indication mark having a lowest display priority;

means for, responsive to the signal is input from the sensor arranged in the working machine tat is independent of operator input, displaying a caution mark indicating the input signal, the caution mark being displayed at the display segment corresponding to the determined state indication mark having lowest display priority.

12. A display device for a working machine, comprising:

a display screen having a plurality of display segments;

a controller displaying a plurality of state indication marks indicating working state of the working machine on the display screen, each of the state indication marks being displayed in each of the display segments, and each of the state indication marks being associated with a display priority, the controller;

receiving an input from a sensor arranged in the working machine that is independent of operator input, determining a state indication mark having a lowest display priority; and displaying a caution mark in response to the input from the sensor arranged in the working machine that is independent of operator input, the caution mark being displayed at the display segment corresponding to the determined state indication mark having lowest display priority.

* * * * *